US009165213B2

(12) United States Patent
Nobuta et al.

(10) Patent No.: US 9,165,213 B2
(45) Date of Patent: Oct. 20, 2015

(54) INFORMATION PROCESSING APPARATUS, INFORMATION PROCESSING METHOD, AND PROGRAM

(71) Applicant: SONY CORPORATION, Minato-ku (JP)

(72) Inventors: Harumitsu Nobuta, Kyoto (JP); Kenta Kawamoto, Tokyo (JP); Kohtaro Sabe, Tokyo (JP); Kuniaki Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 159 days.

(21) Appl. No.: 13/691,109

(22) Filed: Nov. 30, 2012

(65) Prior Publication Data

US 2013/0148879 A1  Jun. 13, 2013

(30) Foreign Application Priority Data

Dec. 7, 2011  (JP) ................................. 2011-267560

(51) Int. Cl.
*G06K 9/62* (2006.01)
*G06K 9/34* (2006.01)

(52) U.S. Cl.
CPC .. *G06K 9/62* (2013.01); *G06K 9/34* (2013.01); *G06K 9/627* (2013.01)

(58) Field of Classification Search
None
See application file for complete search history.

(56) References Cited

U.S. PATENT DOCUMENTS

| 5,524,176 | A  | * | 6/1996  | Narita et al. ....................... 706/2 |
| 5,732,697 | A  | * | 3/1998  | Zhang et al. .................. 600/300 |
| 6,728,404 | B1 | * | 4/2004  | Ono et al. ..................... 382/190 |
| 8,595,007 | B2 | * | 11/2013 | Kane ............................. 704/246 |

OTHER PUBLICATIONS

Yamashita et al., "Emergence of Functional Hierarchy in a Multiple Timescale Neural Network Model: A Humanoid Robot Experiment", PLoS Computational Biology | www.ploscompbiol.org Nov. 1, 2008 | vol. 4 | Issue 11 | p. 1-18.*

Harumitsu Nobuta, et al., "Acquisition of space map based on the body schema by the nerve dynamics model", The 29th Japan Robotics Society Academic Conference (Sep. 7-9, 2011), 14 pages (with English Translation).

* cited by examiner

*Primary Examiner* — Thomas Conway
(74) *Attorney, Agent, or Firm* — Sony Corporation

(57) ABSTRACT

An information processing apparatus includes a network learning portion that performs learning of an appearance/position recognition network by constraining first to third weights and using a learning image, wherein the appearance/position recognition network has a foreground layer including a position node, a background layer including a background node, and an image layer including a pixel node, and is a neural network in which the position node, the background node, and the pixel node are connected to each other, and wherein the first weight is a connection weight between the position node and the pixel node, the second weight is a connection weight between the position node and the background node, and the third weight is a connection weight between the background node and the pixel node.

14 Claims, 19 Drawing Sheets

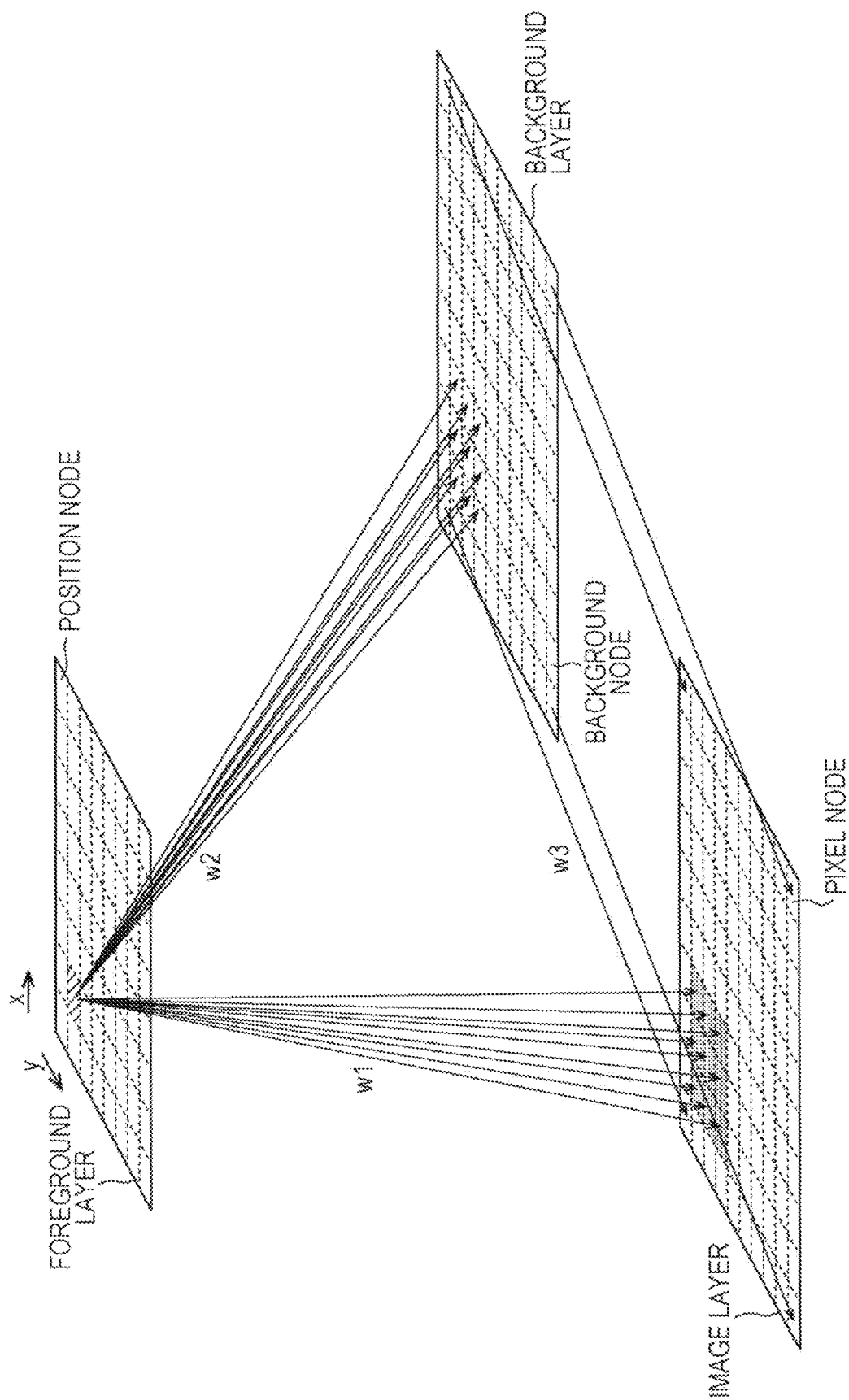

FIG. 9
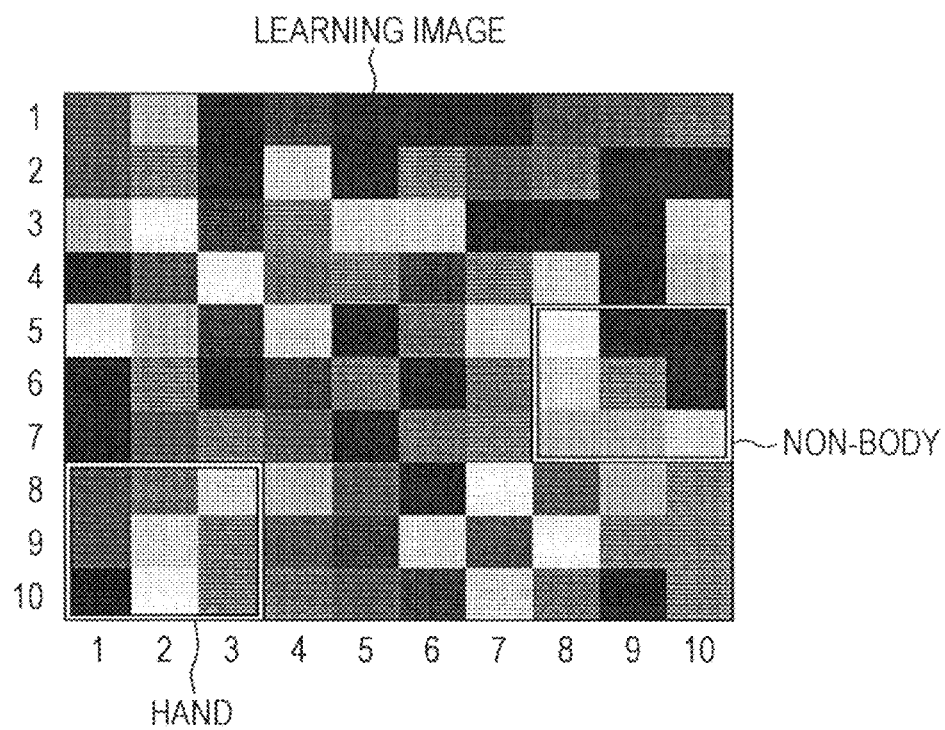
FIG. 10
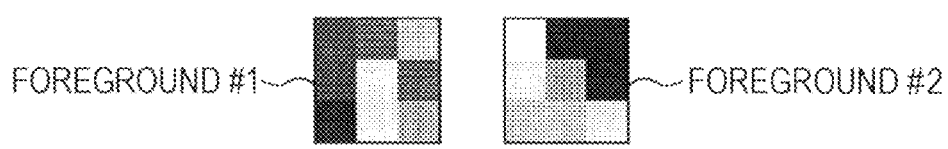
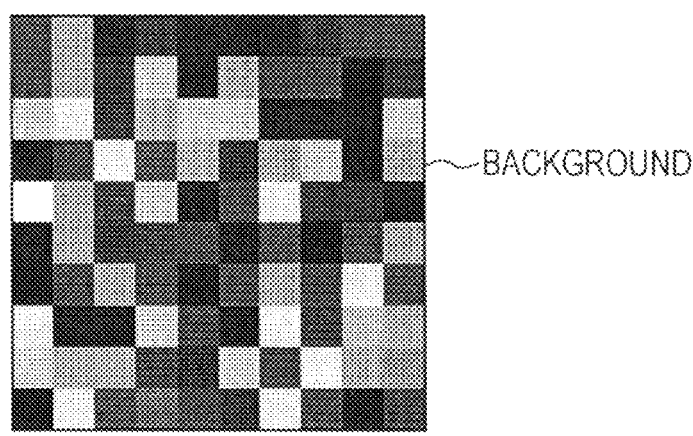

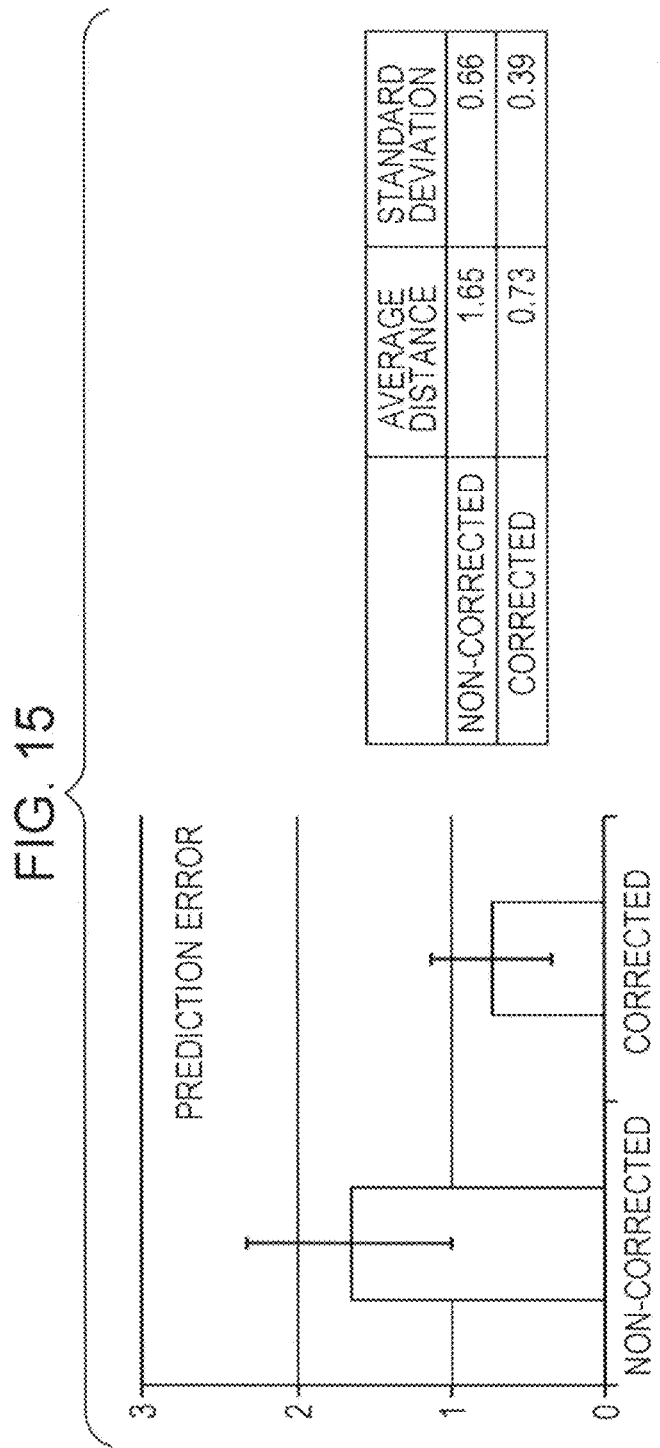

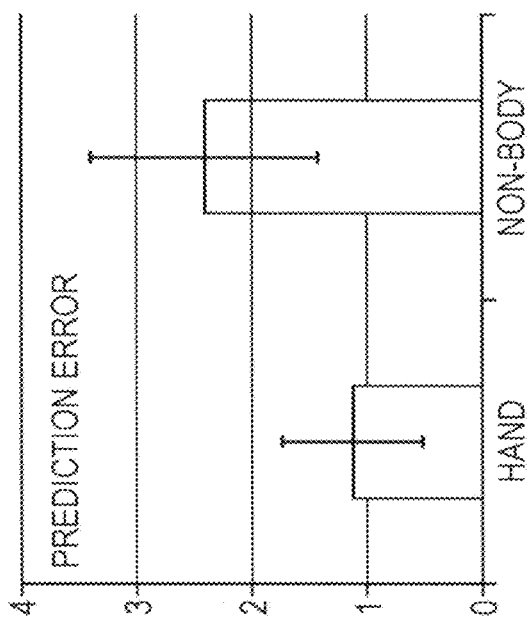

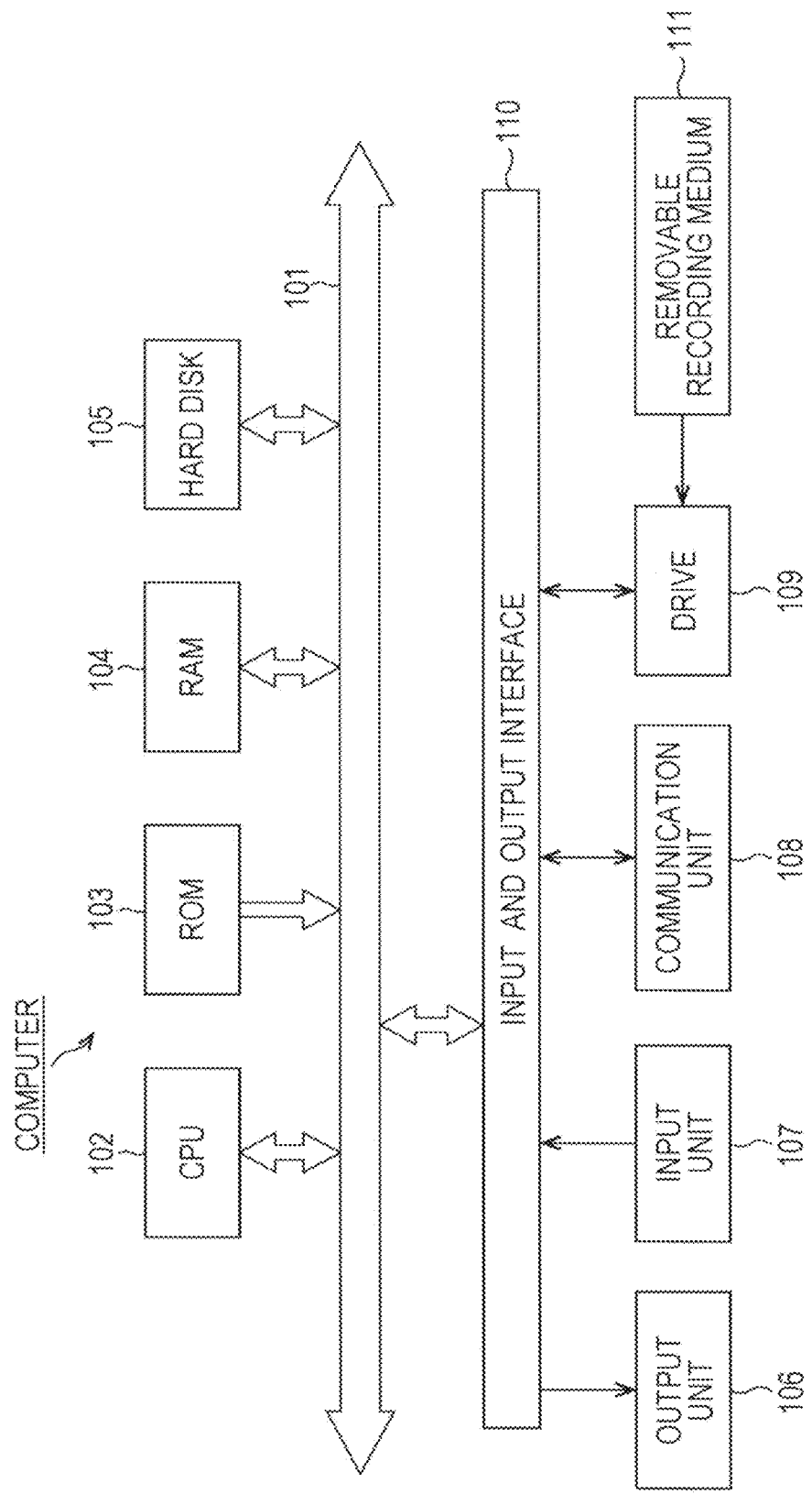

INFORMATION PROCESSING APPARATUS, INFORMATION PROCESSING METHOD, AND PROGRAM

BACKGROUND

The present technology relates to an information processing apparatus, an information processing method, and a program, and, particularly to an information processing apparatus, an information processing method, and a program, enabling an agent such as a robot capable of performing various actions to easily perform learning of objects or the like in an environment in which the actions are performed.

For example, in a case where an agent capable of performing actions performs an object moving task in which the agent moves a body which is an object such as the hand of the agent which can be moved by the agent itself and thereby moves a non-body which is an object other than the body of the agent without prior knowledge by using captured images of the environment in which the agent is placed, it is necessary for the agent to recognize the hand in the image as in the hand regard performed by an infant.

For example, in "Harumitsu NOBUTA, Shun NISHIDE, Tetsuya OGATA, Hiroshi G. OKUNO, "Acquisition of Spatial Map based on Body Schema Using Neurodynamical Model", THE 29TH ANNUAL CONFERENCE OF THE ROBOTICS SOCIETY OF JAPAN", a method has been proposed in which an MTRNN (Multiple Timescale Recurrent Neural Network) for acquiring a body schema as an internal model is employed, and an agent identifies a body of the agent among a plurality of objects including the body of the agent by using the MTRNN.

In "Harumitsu NOBUTA, Shun NISHIDE, Tetsuya OGATA, Hiroshi G. OKUNO, "Acquisition of Spatial Map based on Body Schema Using Neurodynamical Model", THE 29TH ANNUAL CONFERENCE OF THE ROBOTICS SOCIETY OF JAPAN", a movement command issued for moving the body by the agent, and position information in an environment of three objects including one object which is the body of the agent which is moved in response to the movement command and two objects which are non-bodies, are given to the MTRNN, and then the MTRNN is learned.

In addition, in "Harumitsu NOBUTA, Shun NISHIDE, Tetsuya OGATA, Hiroshi G. OKUNO, "Acquisition of Spatial Map based on Body Schema Using Neurodynamical Model", THE 29TH ANNUAL CONFERENCE OF THE ROBOTICS SOCIETY OF JAPAN", only a movement command is given to the MTRNN after being learned, and the movement command is recognized. Thereafter, in "Harumitsu NOBUTA, Shun NISHIDE, Tetsuya OGATA, Hiroshi G. OKUNO, "Acquisition of Spatial Map based on Body Schema Using Neurodynamical Model", THE 29TH ANNUAL CONFERENCE OF THE ROBOTICS SOCIETY OF JAPAN", prediction values of the position information of the three objects are obtained (generated) using the recognition result of the movement command from the MTRNN, and position information of the body of the agent (and position information of the non-bodies) are specified from the position information of the three objects on the basis of prediction errors of the prediction values. Further, an object moved along positions indicated by the position information is identified as the body of the agent.

SUMMARY

However, in the agent, if position information of an object is to be obtained from an image which can be observed by the agent, that is, an image captured by a camera, it is necessary to recognize an object, of which position information is desired to be obtained, in the image, and for this, learning of the object is necessary.

If the object in the image is to be learned, it is necessary to extract a foreground which is a portion on which the object is impressed in the image.

As methods of extracting a foreground on which a certain object is impressed in an image, there is a method of putting marks for specifying the object on the object and extracting a closed region including the marks as a foreground, or a method of extracting a moving closed region in an image as a foreground on the basis of a difference between frames on the premise that the object moves.

However, putting marks on an object or extracting a closed region from an image is troublesome. In addition, as other methods of extracting a foreground, there is a method of acquiring a background using a certain method in advance and extracting a region in which a difference with the background is great from an image as a foreground, or a method of recognizing a foreground in an image by using a recognition device which has performed dedicated recognition learning of a specific foreground such as the human face or known objects; however, acquiring a background in advance or performing learning in the recognition device is also troublesome.

It is desirable to enable an agent such as a robot capable of performing actions to easily perform learning of objects or the like in an environment in which the actions are performed.

According to an embodiment of the present technology, there is provided an information processing apparatus including, or a program causing a computer to function as, a network learning portion that performs learning of an appearance/position recognition network by constraining first to third weights and using a learning image, wherein the appearance/position recognition network has a foreground layer including a position node which is a neuron corresponding to a position of a foreground of an image, a background layer including a background node which is a neuron corresponding to a background of an image, and an image layer including a pixel node which is a neuron corresponding to a pixel of an image in which the foreground is superimposed on the background, and is a neural network in which the position node, the background node, and the pixel node are connected to each other, wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground, wherein the background node outputs a value obtained through calculation including weighted sum of outputs of the position node, and wherein the pixel node outputs a value obtained through calculation including weighted sum of outputs of the position node and weighted sum of outputs of the background node.

According to an embodiment of the present technology, there is provided an information processing method including performing learning of an appearance/position recognition network by constraining first to third weights and using a learning image, wherein the appearance/position recognition network has a foreground layer including a position node which is a neuron corresponding to a position of a foreground of an image, a background layer including a background node which is a neuron corresponding to a background of an image, and an image layer including a pixel node which is a neuron corresponding to a pixel of an image in which the foreground is superimposed on the background, and is a neural network in which the position node, the background node, and the pixel node are connected to each other, wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground, wherein the background node outputs a value obtained through calculation including the weighted sum of outputs of the position node, and wherein the pixel node outputs a value obtained through calculation including the weighted sum of outputs of the position node and the weighted sum of outputs of the background node.

According to the above-described embodiment, learning of an appearance/position recognition network is performed by constraining first to third weights and using a learning image. The appearance/position recognition network has a foreground layer including a position node which is a neuron corresponding to a position of a foreground of an image, a background layer including a background node which is a neuron corresponding to a background of an image, and an image layer including a pixel node which is a neuron corresponding to a pixel of an image in which the foreground is superimposed on the background, and is a neural network in which the position node, the background node, and the pixel node are connected to each other. In the learning of the appearance/position recognition network, the first weight which is a connection weight between the position node and the pixel node, the second weight which is a connection weight between the position node and the background node, and the third weight which is a connection weight between the background node and the pixel node, are constrained. In the appearance/position recognition network, the position node outputs a value corresponding to position information which is input as an input value and indicates a position of the foreground, the background node outputs a value obtained through calculation including weighted sum of outputs of the position node, and the pixel node outputs a value obtained through calculation including the weighted sum of outputs of the position node and weighted sum of outputs of the background node.

In addition, the information processing apparatus may be an independent apparatus or may be an internal block forming a single apparatus.

Further, the program may be provided by being transmitted via a transmission medium or being recorded on a recording medium.

According to an embodiment of the present technology, it is possible for an agent to easily perform learning of objects or the like in an environment in which actions are performed.

BRIEF DESCRIPTION OF THE DRAWINGS

FIG. 4 is a diagram illustrating an example of the appearance/position recognition network.

FIG. 9 is a diagram illustrating an example of the learning image used for a simulation.

FIG. 10 is a diagram illustrating an example of the constituent elements of the learning image used for the simulation.

FIG. 15 is a diagram illustrating a result of a simulation performed for the MTRNN.

FIG. 19 is a diagram illustrating a result of a simulation of the learning process and the identification process.

FIG. 20 is a block diagram illustrating a configuration example of the computer according to an embodiment of the present technology.

DETAILED DESCRIPTION OF EMBODIMENTS

Agent according to Embodiment of Present Technology

Figure 1:
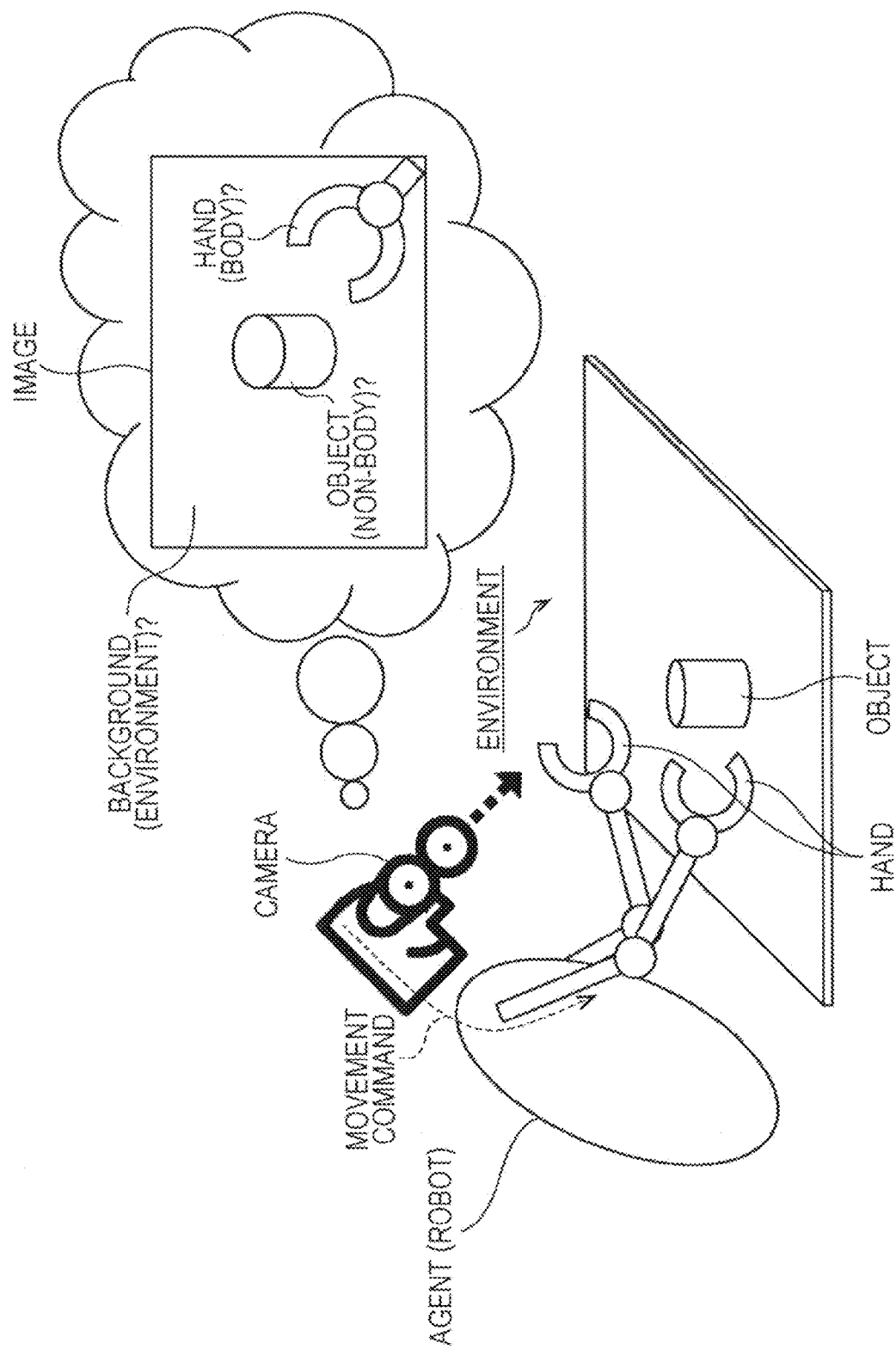
FIG. 1 is a diagram illustrating an outline of an agent according to an embodiment of the present technology.

FIG. 1 is a diagram illustrating an outline of an agent according to an embodiment of the present technology.

In FIG. 1, the agent issues a movement command for moving a body of the agent, and the body of the agent is moved in response to the movement command issued by the agent.

For example, the hand which is a body of the agent is moved in response to a movement command issued by the agent.

The agent perceives an environment in which the agent (the hand which is a body thereof) is placed through vision, that is, photographs the environment with cameras, and learns the environment in which the agent is placed using an image obtained as a result thereof.

In FIG. 1, the agent (the hand thereof) is placed on a table where a non-body object (an object which is not the body of the agent) which is moved by coming into contact with other objects is present.

The agent moves the hand by issuing a movement command, photographs the environment in which the agent is placed with the cameras, and acquires an image of the environment where the agent is placed.

In FIG. 1, the table as a background, and the hand and the non-body which are objects as foregrounds are impressed on the image acquired by the agent, but the agent does not have prior knowledge of the table, the hand, and the non-body in the environment.

In addition, when the agent moves the hand, if the hand comes into contact with the non-body on the table, the non-body may be moved according to the movement of the hand.

The agent performs learning of the objects (the hand and the non-body) which are foregrounds of the image and the table which is a background thereof by using the hand which is moved in response to a movement command, the non-body which may be moved when the hand comes into contact therewith, and the image on which the table on which the hand and the non-body are placed is impressed, thereby acquiring an appearance of each of the foregrounds and the background.

Further, the agent identifies whether or not (each of) the objects impressed on the image (is) are the hand moved in response to movement commands by using a sequence of the movement commands and the image on which the hand moved in response to the movement commands is impressed.

In addition, as a non-body object, an object which is not moved as long as the hand moved in response to a movement command does not come into contact therewith may be employed, or an object (for example, hands of other agents) moved regardless of a movement command of the agent even if the hand does not come into contact therewith may be employed. Further, in a case of employing an object moved regardless of a movement command of an agent as the non-body object, settings may be employed in which, when the non-body object comes into contact with a hand moved in response to a movement command, the non-body object is moved by the contact, or settings may be employed in which the non-body object is not moved depending on contacts even if coming into contact with the hand.

Figure 2:
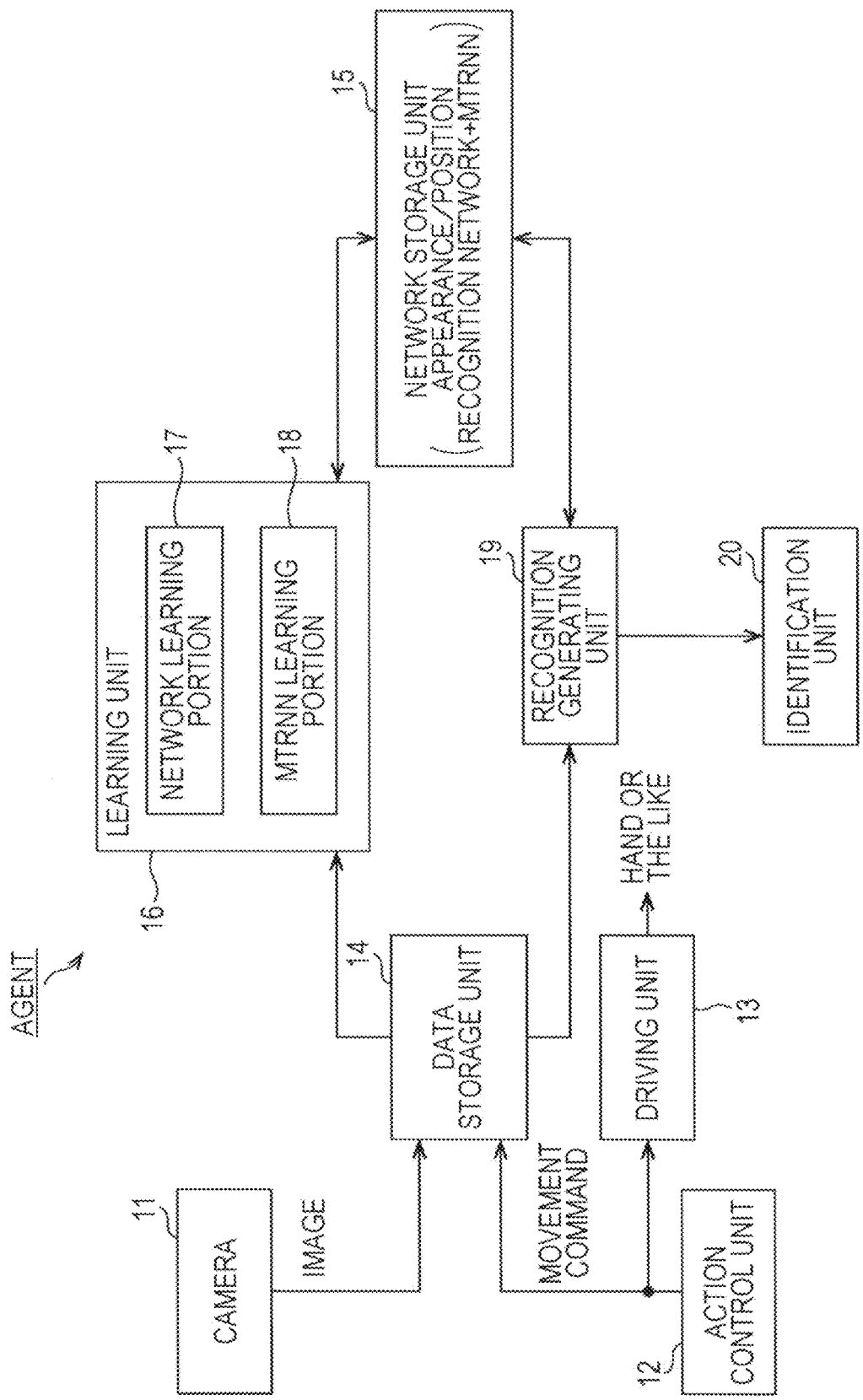
FIG. 2 is a block diagram illustrating a configuration example of the agent according to an embodiment of the present technology.

FIG. 2 is a block diagram illustrating a configuration example of the agent according to an embodiment of the present technology.

In FIG. 2, the agent includes a camera 11, an action control unit 12, a driving unit 13, a data storage unit 14, a network storage unit 15, a learning unit 16, a recognition generating unit 19, and an identification unit 20.

The camera 11 has a function as the vision of the agent, photographs the environment in which the agent is placed at a predetermined frame rate, and supplies an image (an observation value which the agent observes (can observe)) obtained as a result thereof to the data storage unit 14.

The action control unit 12 issues a movement command which is a control signal for moving the body such as the hand of the agent so as to be supplied to the driving unit 13 and the data storage unit 14.

The driving unit 13 is an actuator driving the body such as the hand of the agent, and is driven in response to a movement command from the action control unit 12. The driving unit 13 is driven in response to the movement command, thereby moving the body such as the hand of the agent.

In addition, hereinafter, the action control unit 12 issues a movement command for moving, for example, the hand of the agent.

The data storage unit 14 stores the images supplied from the camera 11 and the movement commands supplied from the action control unit 12 in a time series.

Further, the data storage unit 14 stores the images supplied from the camera 11 and the movement commands supplied from the action control unit 12 in correlation with each other.

In other words, the data storage unit 14 stores, for example, a movement command supplied from the action control unit 12 and a captured image of the environment including the hand immediately after being moved in response to the movement command in correlation with each other.

The network storage unit 15 stores a network in which neurons (a model imitating the neurons) are connected as an internal model imitating the human brain (a portion thereof).

Here, in the embodiment, the network stored in the network storage unit 15 is a network for the agent identifying the hand which is the body of the agent, and, is hereinafter also referred to as an identification network.

In the network storage unit 15, an appearance/position recognition network and an MTRNN are stored as the identification networks.

In the appearance/position recognition network as the identification network, an appearance of each of a foreground and a background of an image is acquired through learning thereof using (only) the image.

According to the appearance/position recognition network which has been learned, a position of the foreground of the image can be recognized from the image, and it is possible to generate an image (a prediction value thereof) in which the foreground is present at the position by giving the position of the foreground.

In the MTRNN as the identification network, a relationship between a movement command and a position of the hand (a trajectory (movement) of positions of the hand) is obtained through learning thereof using a movement command and position information indicating the position of the hand on an image on which, for example, the hand of the agent is at least impressed as an object moved in response to the movement command.

According to the MTRNN which has been learned, it is possible to generate a sequence of position information (prediction values thereof) of the hand which is an object moved in response to a sequence of the movement commands from the sequence of the movement commands, to generate a sequence of movement commands (prediction values thereof) for moving the hand so as to draw a sequence of the position information from the sequence of the position information of the hand, or the like.

The learning unit 16 performs learning of the identification network stored in the network storage unit 15 by using the images or movement commands stored in the data storage unit 14 as data for learning the identification network (learning data).

In other words, the learning unit 16 has a network learning portion 17 and an MTRNN learning portion 18.

The network learning portion 17 performs learning of the appearance/position recognition network stored in the network storage unit 15 by using the images stored in the data storage unit 14.

The MTRNN learning portion 18 performs learning of the MTRNN stored in the network storage unit 15 by using position information of a foreground of an image and a movement command recognized from the image stored in the data storage unit 14.

Here, the position information of the foreground of the image used for the learning of the MTRNN in the MTRNN learning portion 18 is recognized by giving the image to the appearance/position recognition network.

The recognition generating unit 19 performs a recognition process of recognizing movement commands stored in the data storage unit 14 by using the MTRNN which is the identification network stored in the network storage unit 15, or performs a generation process of generating a prediction value of position information of an object moved in response to movement commands from the movement commands stored in the data storage unit 14.

In addition, the recognition generating unit 19 performs a recognition process (hereinafter, also referred to as a foreground position recognition process) of recognizing a position (information) of a foreground of an image from the image stored in the data storage unit 14 by using the appearance/position recognition network which is the identification network stored in the network storage unit 15.

The recognition generating unit 19 supplies a prediction value of the position information of the object which is a foreground obtained through the generation process using the MTRNN and the position information of the foreground obtained through the foreground position recognition process using the appearance/position recognition network, to the identification unit 20.

The identification unit 20 obtains prediction errors of the prediction values of the position information of the object which is a foreground obtained through the generation process using the MTRNN by using the position information of the foreground obtained through the foreground position recognition process using the appearance/position recognition network as a true value, and identifies whether or not (each) foreground of an image captured by the camera 11 is an object moved in response to a movement command on the basis of the prediction errors.

In addition, the action control unit 12 may perform learning of the identification network stored in the network storage unit 15, and may issue movement commands, for example, according to a predefined inherent rule until a foreground in an image captured by the camera 11 is recognized in the identification unit 20. Further, after the foreground in the image captured by the camera 11 is recognized, until whether or not the foreground is an object moved in response to a movement command, that is, here, the hand of the agent is identified, for example, first, assuming that the foreground is the hand of the agent, a movement command may be issued.

If the identification network is learned, and whether or not a foreground in the image captured by the camera 11 is the hand identified in the identification unit 20, the agent can recognize the hand (a state thereof) impressed on the image captured by the camera 11 in the same manner as a person viewing the hand thereof and perceiving his/her own hand, the action control unit 12 can issue a movement command for moving the hand from a present state to a desired state.

Appearance/Position Recognition Network

Hereinafter, a description will be made of the appearance/position recognition network as the identification network stored in the network storage unit 15.

As described with reference to FIG. 2, in relation to the appearance/position recognition network, through learning thereof using an image, an appearance of each of a foreground and a background of the image is acquired.

Figure 3A:
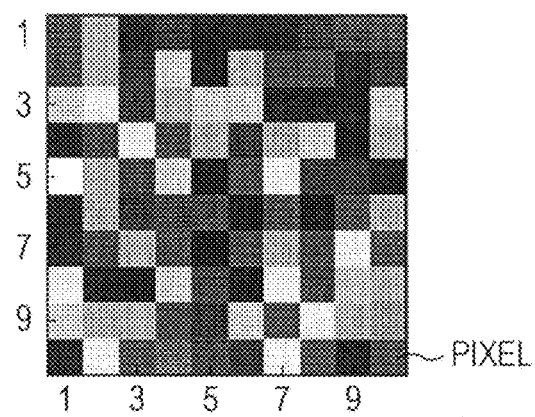
FIGS. 3A and 3B are diagrams illustrating an example of the background and the foreground of the image used for learning of an appearance/position recognition network.
Figure 3B:
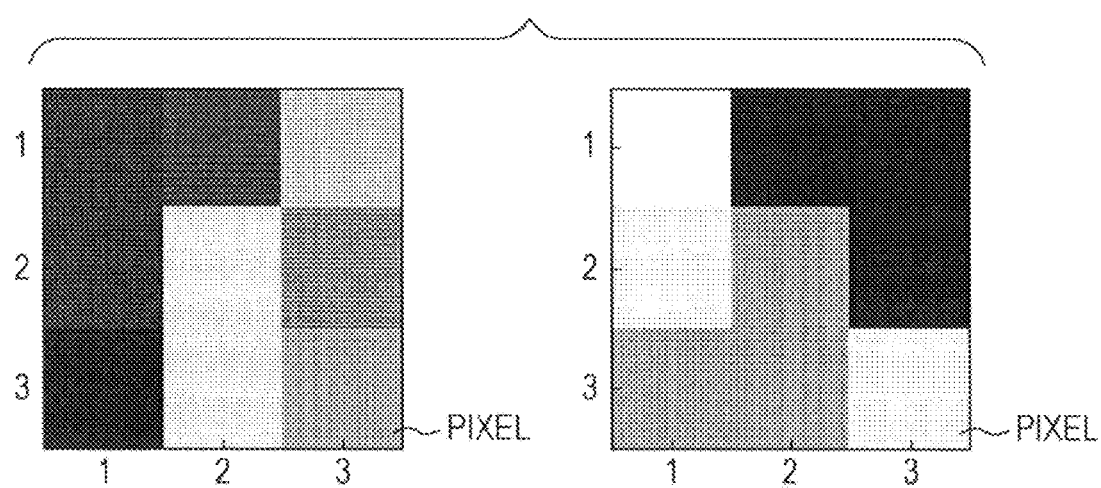

FIGS. 3A and 3B are diagrams illustrating an example of the background and the foreground of an image used for learning of the appearance/position recognition network, that is, an image captured by the camera 11 of FIG. 2.

FIG. 3A is a diagram illustrating an example of the background.

In FIG. 3A, the background has 10×10 pixels in width×height.

FIG. 3B is a diagram illustrating an example of the foreground.

In FIG. 3B, the foreground has 3×3 pixels in width×height.

Hereinafter, for simplicity of description, it is assumed that an image captured by the camera 11 is a grayscale image of 10×10 pixels in which the foreground of 3×3 pixels as shown in FIG. 3B is superimposed on the background of 10×10 pixels as shown in FIG. 3A.

Further, although two foregrounds are shown in FIG. 3B, one or two or more foregrounds as shown in FIG. 3B are assumed to be present in an image captured by the camera 11.

In addition, the foreground is assumed to be superimposed on the background so as to show its entirety.

Therefore, the number of positions which can be taken by the foreground of 3×3 pixels is 8×8=64 on the image of 10×10 pixels.

In addition, in a case where a plurality of foregrounds are present, the foregrounds have to show their entirety and thus do not overlap the other foregrounds.

FIG. 4 is a diagram illustrating an example of the appearance/position recognition network.

In other words, FIG. 4 shows an example of the appearance/position recognition network in a case where the camera 11 (FIG. 2) captures an image in which a single foreground of 3×3 pixels is superimposed on a background of 10×10 pixels as described with reference to FIGS. 3A and 3B.

The appearance/position recognition network includes a foreground layer, a background layer, and an image layer, and is a neural network in which the foreground layer, the background layer, and the image layer (neurons thereof) are connected to each other.

The foreground layer includes position nodes which are neurons corresponding to positions of the foreground of the image.

In the image of 10×10 pixels, the foreground of 3×3 pixels may be disposed at eight positions in each of the x direction (horizontal (transverse) direction) and the y direction (vertical (longitudinal) direction).

For this reason, the foreground layer has 64 (=8×8) position nodes corresponding to 64 positions in total, at eight positions in each of the x direction and the y direction.

The background layer includes background nodes which are neurons corresponding to the background of the image.

Since the background of the image of 10×10 pixels includes 10×10 pixels, the background layer has background nodes of 100=10×10 corresponding to 100 pixels in total, at ten positions in each of the x direction and the y direction.

The image layer includes pixel nodes which are neurons corresponding to pixels of the image of 10×10 pixels in which the foreground of 3×3 pixels is superimposed on the background of 10×10 pixels.

In addition, the image layer has pixel nodes of 100=10×10 corresponding to 100 pixels in total, at ten positions in each of the x direction and the y direction.

In the appearance/position recognition network, the position nodes of the foreground layer, the background nodes of the background layer, and the pixel nodes of the image layer are connected to each other.

Here, hereinafter, appropriately, the position node, the background node and the pixel node are also simply referred to as a node without particularly differentiating them from each other.

In addition, in FIG. 4 (also the same for the figures described later), in order to prevent the figure from being complicated, in relation to connection between the nodes, only connections between some nodes are indicated by the arrows.

Hereinafter, a weight (first weight) which is a connection weight between the position node and the pixel node is indicated by $w1$, a weight (second weight) which is a connection weight between the position node and the background node is indicated by $w2$, and a weight (third weight) which is a connection weight between the background node and the pixel node is indicated by $w3$.

In the foreground layer, a position node (x,y) which is located at the x-th position in the horizontal direction (rightward) and the y-th position in the vertical direction (downward) from the upper left side corresponds to a position of the foreground which is superimposed in a range of 3×3 pixels centering on a pixel which is located at the (x+1)-th position in the horizontal direction and the (y+1)-th position in the vertical direction from the upper left side in the image.

Therefore, in FIG. 4, a position node (2,2) (in the figure, a position node to which the diagonal lines are applied) which is located at the second position in the horizontal direction and the second position in the vertical direction from the upper left side of a foreground layer indicates a position of the foreground when the foreground is present in a range of 3×3 pixels (in the figure, pixels corresponding to the pixel nodes to which the shadow is applied) centering on a pixel which is located at the 3(=2+1)rd position in the horizontal direction and the 3(=2+1)rd position in the vertical direction from the upper left side.

Here, a position of the center (centroid) of the foreground is set as a position of the foreground. In this case, a position node (x,y) corresponds to a position (x+1,y+1) on the image (indicates a position (x+1,y+1)).

Hereinafter, for simplicity of description, the appearance/position recognition network will be described by paying attention to one direction of the x direction and the y direction, for example, only to the x direction.

Figure 5:
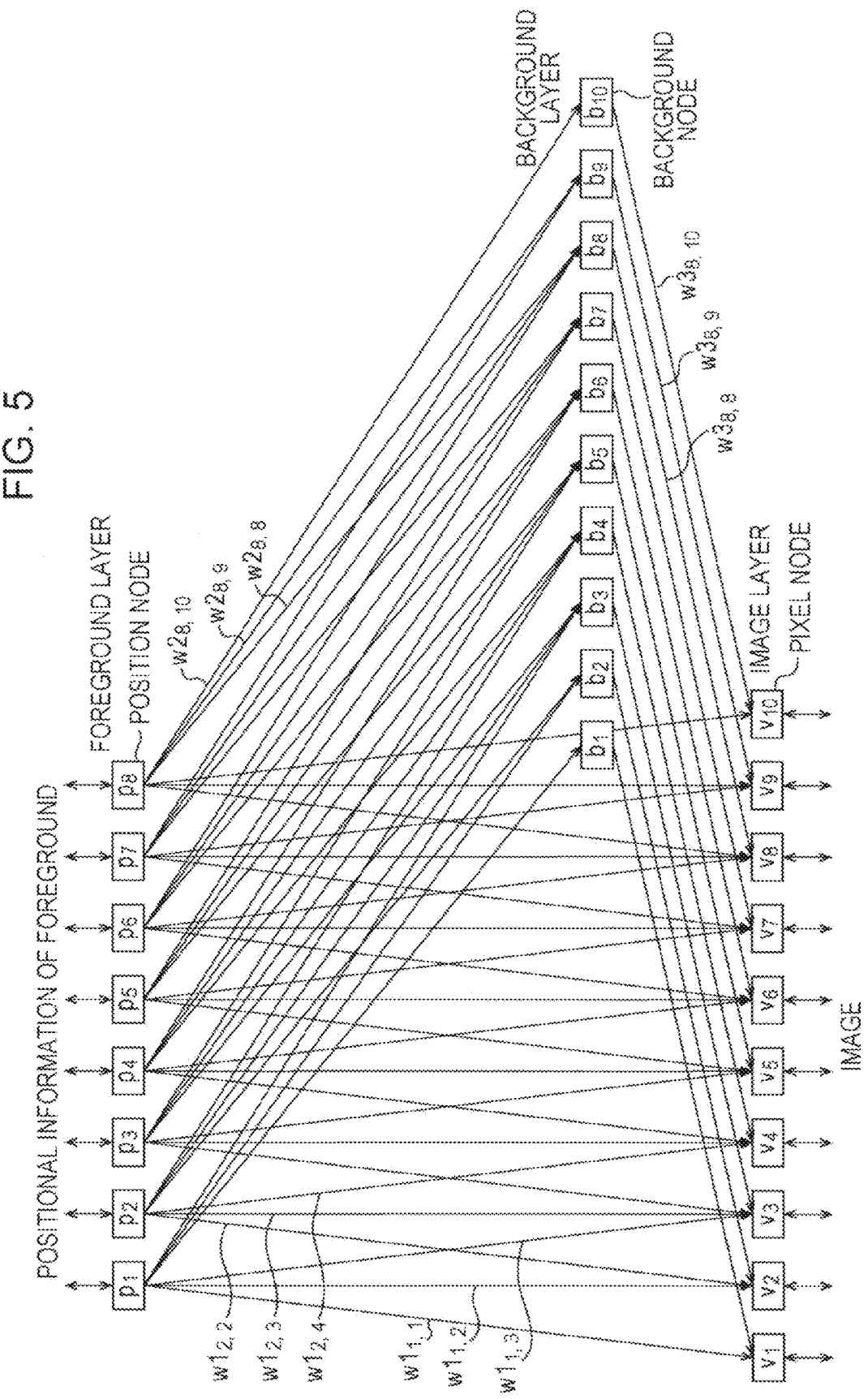
FIG. 5 is a diagram illustrating the appearance/position recognition network in which attention is paid only to the x direction.

FIG. 5 is a diagram illustrating the appearance/position recognition network of FIG. 4 in which attention is paid only to the x direction.

In FIG. 5, $p_i$ indicates an i-th position node from the left, $b_k$ indicates a k-th background node from the left, and $v_k$ indicates a k-th pixel node from the left. In addition, a weight $w1_{i,k}$ indicates a weight between a position node $p_i$ and a pixel node $v_k$, a weight $w2_{i,k}$ indicates a weight between the position node $p_i$ and a background node $b_k$, and a weight $w3_{k,k}$ indicates a weight between the background node $b_k$ and the pixel node $v_k$.

In FIG. 5 (also the same for FIG. 6 described later), since attention is paid only to the x direction of the appearance/position recognition network of FIG. 4, the foreground layer includes eight position nodes $p_1$ to $p_8$ in the x direction, the background layer includes ten background nodes $b_1$ to $b_{10}$ in the x direction, and the image layer includes ten pixel nodes $v_1$ to $v_{10}$ in the x direction.

In relation to each node of the position node $p_i$, the background node $b_k$, and the pixel node $v_k$, a calculation including weighted sum where inputs to the node are multiplied by a weight (a weight between a node to which an input is given and a node which outputs the input) which is a corresponding connection weight and are summed is performed, and a value obtained through the calculation is output as an output value of the node.

As the calculation including weighted sum, a calculation of a predetermined function which has a weighted sum value obtained as a result of the weighted sum as an argument may be employed.

The predetermined function which has a weighted sum value as an argument may employ, for example, a sigmoid function, or a hyperbolic tangent tanh, and other differentiable functions f( ) such as f(x)=x.

In addition, a node of the appearance/position recognition network may not be a node (neuron) which stores an output value as a context, such as an RNN (Recurrent Neural Network).

In the appearance/position recognition network, position information indicating a position of the foreground is input to the position node $p_i$ from an external device (the network learning portion 17) as an input value, and undergoes weighted sum.

Here, a piece of position information (information indicating a probability that a foreground is present at a position corresponding to the position node $p_i$) is input to the position node $p_i$, and there is no weight for an input of the position information (the weight is set to 1).

Therefore, a weighted sum value obtained in the position node $p_i$ is a value itself as the position information input to the position node $p_i$.

In the position node $p_i$, a predetermined function which has a weighted sum value, that is, here, an input value itself input to the position node $p_i$ as an argument is calculated, and, a calculation value (a value corresponding to the position information as an input value) obtained as a result thereof is output as an output value of the position node $p_i$.

In the background node $b_k$, weighted sum where the output values of the position node $p_i$ are multiplied by the weight w2 and are summed is performed. In addition, in the background node $b_k$, a predetermined function which has a weighted sum value obtained as a result of the weighted sum as an argument is calculated, and a calculation value obtained as a result thereof is output as an output value of the background node $b_k$.

In the pixel node $v_k$, weighted sum where the output values of the position node $p_i$ are multiplied by the weight w1 and are summed, and weighted sum where the output values of the background node $b_k$ are multiplied by the weight w3 and are summed, are performed. In addition, in the pixel node $v_k$, a predetermined function which has a weighted sum value obtained as a result of the weighted sum as an argument is calculated, and a calculation value obtained as a result thereof is output as an output value of the pixel node $v_k$.

In the appearance/position recognition network, the weights w1, w2 and w3 are constrained depending on a predetermined value or a predetermined condition.

That is to say, as a constraint of the weight w1, in relation to any two position nodes $p_i$ and $p_{i'}$, a weight $w1_{i,k}$ between a pixel node $v_k$ corresponding to a pixel in an image located at a position having a predetermined positional relationship C from a position corresponding to one position node $p_i$ and one position node $p_i$, and a weight $w1_{i',k'}$ between a pixel node $v_{k'}$ corresponding to a pixel in the image located at a position having the same positional relationship C from a position corresponding to the other position node $p_{i'}$ and the other position node $p_{i'}$, are constrained to the same value, and thus the weight $w1_{i,k}$ and weight $w1_{i',k'}$ are the same.

For example, in FIG. 5, in relation to any two position nodes $p_i$ and $p_{i'}$, the weights $w1_{i,i}$ and $w1_{i',i'}$ are constrained to the same value, the weights $w1_{i,i+1}$ and $w1_{i',i'+1}$ are constrained to the same value, and the weights $w1_{i,i+2}$ and $w1_{i',i'+2}$ are also constrained to the same value.

Specifically, for example, in FIG. 5, a weight $w1_{1,1}$ between the position node $p_1$ and the pixel node $v_1$ which has a predetermined positional relationship C from a position (a position of a pixel corresponding to the pixel node $v_2$) corresponding to the position node $p_1$, for example, corresponding to a pixel in the image located to the left by one pixel, and a weight $w1_{2,2}$ between the position node $p_2$ and the pixel node $v_2$ corresponding to a pixel in the image located to the left by one pixel as the same positional relationship C from a position (a position of a pixel corresponding to the pixel node $v_3$) corresponding to the position node $p_2$, are constrained to the same value.

In addition, the position node $p_i$ has the weight w1 with all the pixel nodes $v_1$, $v_2$, . . . , and $v_{10}$; however, here, for simplicity of description, in a case where a foreground is present at a position corresponding to the position node $p_i$, the weight w1 between pixel nodes other than pixel nodes corresponding to pixels forming the foreground and the position node $p_i$ is set to 0 (constrained to 0).

In other words, for example, in relation to the position node $p_2$, in a case where a foreground of 3×3 pixels is present at a position corresponding to the position node $p_2$, pixel nodes corresponding to pixels forming the foreground are pixel nodes $v_2$, $v_3$ and $v_4$, and thus the weights $w1_{2,1}$, and $w1_{2,9}$ to $w1_{2,10}$ between the respective pixel nodes $v_1$, and $v_5$ to $v_{10}$ other than the pixel nodes $v_2$, $v_3$ and $v_4$ and the position node $p_2$ are set to 0.

Here, in FIG. 5 (also the same for the figures described later), lines indicating connections between the nodes of which weights are 0 are appropriately omitted.

As a constraint of the weight w2, in relation to each position node $p_i$, the weight $w2_{i,k}$ between the position node $p_i$ and the background node $b_k$ corresponding to a background in a predetermined range R having a position corresponding to the position node $p_i$ as a reference is constrained to, for example, −1 which is a fixed value for suppressing firing of the background node $b_k$. A fixed value for suppressing firing of the background node $b_k$ is (set to be) different depending on a calculation described later performed using an input to the background node $b_k$ in the background node $b_k$.

As the predetermined range R, for example, the size (or more) of a foreground is employed.

Therefore, for example, in relation to the position node $p_8$, the weights $w2_{8,8}$, $w2_{8,9}$ and $w2_{8,10}$ between the position node $p_8$ and the background nodes $b_8$, $b_9$ and $b_{10}$ in a range of three pixels as the predetermined range R having a position corresponding to the position node $p_8$ as a reference (center) are fixed to −1.

In addition, as a constraint of the weight w2, in relation to each position node $p_i$, the weight $w2_{i,k}$ between the position node $p_i$ and the background node $b_k$ corresponding to the background out of the predetermined range R having a position corresponding to the position node $p_i$ as a reference are fixed to 0.

Therefore, for example, in relation to the position node $p_8$, the weights $w2_{8,1}$ to $w2_{8,7}$ between the position node $p_8$ and the respective background nodes $b_1$ to $b_7$ out of a range of three pixels which is the predetermined range R having a position corresponding to the position node $p_8$ as a reference are fixed to 0.

As a constraint of the weight w3, in relation to each background node $b_k$, the weight $w3_{k,k'}$ between the background node $b_k$ and the pixel node $v_{k'}$ ($k \neq k'$) corresponding to a pixel other than a pixel (a pixel on which a background is impressed) of the background corresponding to the background node $b_k$ is fixed to 0.

In addition, in relation to the weight w3, for example, the weight w3 between the background node $b_k$ and the pixel node $v_{k'}$ corresponding to pixels other than a plurality of pixels including a pixel of a background corresponding to the background node $b_k$ and peripheral pixels of the pixel of the background may be fixed to 0.

In addition, it can be said that there is no constraint for the weight w3.

The network learning portion 17 (FIG. 2) constrains the weights w1, w2 and w3 as described above, uses the images stored in the data storage unit 14 as learning data, and performs learning of the appearance/position recognition network according to, for example, a BP (Back Propagation) method.

Figure 6:
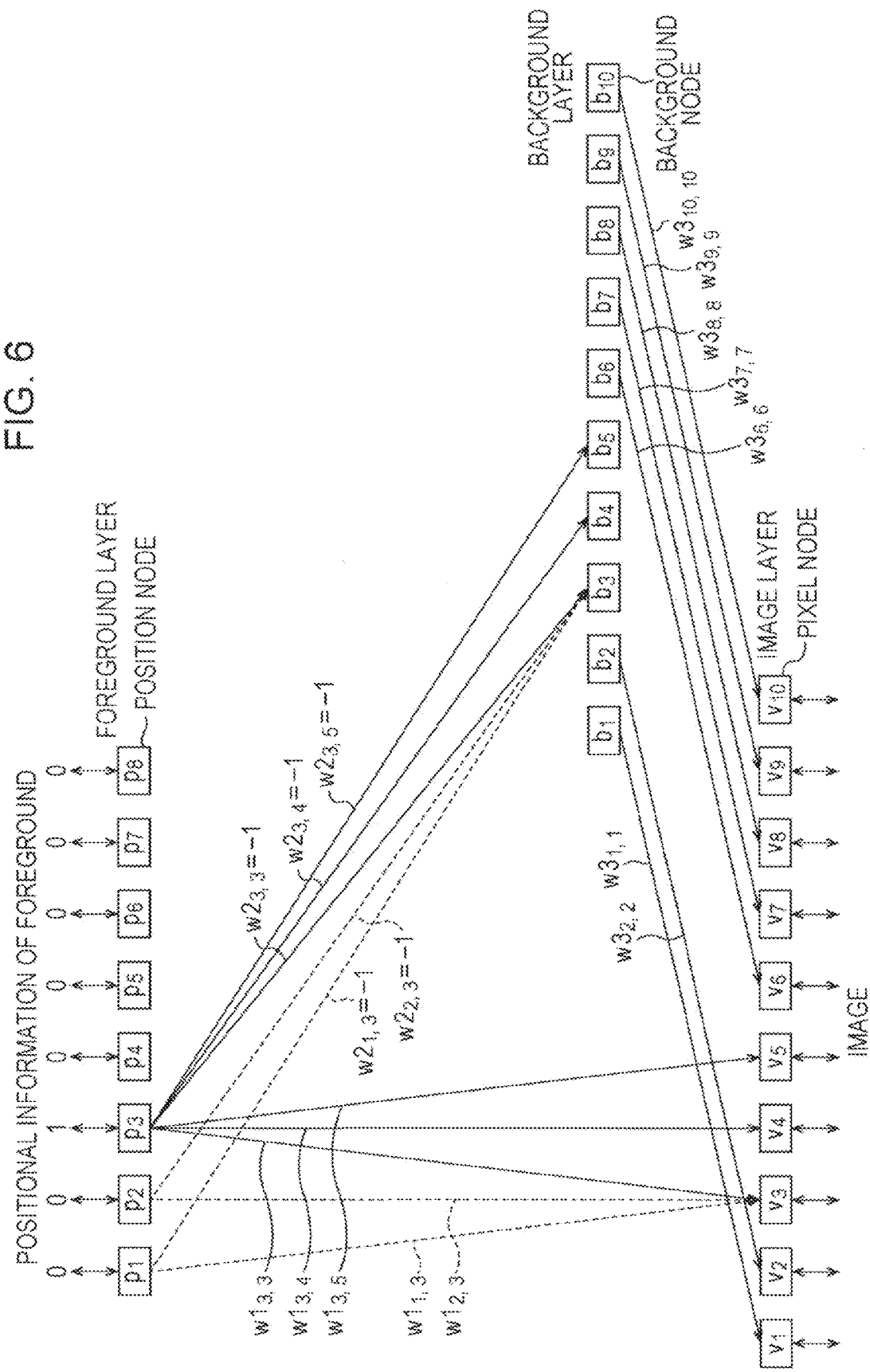
FIG. 6 is a diagram illustrating information transmission of the appearance/position recognition network.

FIG. 6 is a diagram illustrating information transmission of the appearance/position recognition network.

In the appearance/position recognition network, in FIGS. 5 and 6, information transmission downward from the top, that is, information transmission from the position node to the background node and the pixel node and information transmission from the background node to the pixel node are performed.

In the learning of the appearance/position recognition network, the network learning portion 17 gives an image which is learning data to the image layer and gives initial values of 8×8 pieces of position information to the foreground layer.

Here, as an initial value of the position information, for example, a random value or any fixed value may be employed.

In the foreground layer, each of 8×8 pieces of position information is input to a position node $p_i$ corresponding to the position information as an input value.

In the position node $p_i$, weighted sum of an input value to the position node $p_i$ is performed, and a calculation of a predetermined function having a weighted sum value obtained as a result of the weighted sum as an argument is performed. In addition, in the position node $p_i$, the calculation of the predetermined function is output as an output value of the position node $p_i$.

As described with reference to FIG. 5, the weighted sum value obtained in the position node $p_i$ is position information itself which is an input value to the position node $p_i$.

In the position node $p_i$, as a predetermined function $f(y_i)$, for example, $f(y_i)=\exp(y_i)/\Sigma\exp(y_j)$ is employed, the function $f(y_i)$ having the weighted sum value $y_i$ as an argument is calculated, and a calculation value $f(y_i)$ obtained as a result thereof is output as an output value.

In addition, in the expression $f(y_i)=\exp(y_i)/\Sigma\exp(y_j)$, $\exp(\ )$ indicates an exponential function having Napier's constant as a base. Further, $\Sigma$ indicates summation taken by changing the index j of $y_j$ to integers from 1 to the number (in the embodiment, 8×8) of the position node $p_i$. Therefore, the function $f(y_i)$ is a function which normalizes $\exp(y_i)$.

Here, an output value of the position node $p_i$ is appropriately indicated by $p_i$ hereinafter.

Position information which is an input value of the position node $p_i$, and an output value of the position node $p_i$ corresponding to the position information, that is, an extent of firing of the position node $p_i$ indicates a probability (extent) that a foreground is present at a position corresponding to the position node $p_i$. In the embodiment, the position information is a value in a range of, for example, 0 to 1, and indicates that, the larger the value, the higher the probability that a foreground is present.

An output value of the position node $p_i$ is input to each background node and each pixel node.

In relation to the background node $b_k$, as described with reference to FIG. 5, the weight w2 between the background node and the position node is constrained, and, thus, substantially, only output values of the position nodes $p_{k-2}$, $p_{k-1}$ and $p_k$ are input.

In the background node $b_k$, weighted sum of an input to the background node $b_k$ is performed, and a calculation of a predetermined function having a weighted sum value obtained as a result of the weighted sum as an argument is performed. In addition, in the background node $b_k$, the calculation of the predetermined function is output as an output value of the background node $b_k$.

Here, as described above, only the output values of the position nodes $p_{k-2}$, $p_{k-1}$ and $p_k$ are input to the background node $b_k$.

Therefore, a weighted sum value obtained in the background node $b_k$ is a sum total $w2_{k-2,k}p_{k-2}+w2_{k-1,k}p_{k-1}+w2_{k,k}p_k$ of multiplied values obtained by multiplying the output values of the position nodes $p_{k-2}$, $p_{k-1}$ and $p_k$ by corresponding weights $w2_{k-2,k}$, $w2_{k-1,k}$ and $w2_{k,k}$, respectively.

In addition, as described with reference to FIG. 5, the weights $w2_{i,i}$, $w2_{i,i+1}$ and $w2_{i,i+2}$ are fixed (constrained) to $-1$. Therefore, since weights $w2_{k-2,k}$, weight $w2_{k-1,k}$ and $w2_{k,k}$ are also fixed to $-1$, a weighted sum value obtained in the background node $b_k$ is $w2_{k-2,k}p_{k-2}+w2_{k-1,k}p_{k-1}+w2_{k,k}p_k=-(p_{k-2}+p_{k-1}+p_k)$.

For example, a weighted sum value of the background node $b_3$ is $-(p_1+p_2+p_3)$, and a weighted sum value of the background node $b_4$ is $-(p_2+p_3+p_4)$.

In the background node $b_k$, as a predetermined function $f(x)$, for example, $f(x)=1+x$ is employed, the function $f(x)$ having the weighted sum value $-(p_{k-2}+p_{k-1}+p_k)$ as an argument x is calculated, and a calculation value $1-(p_{k-2}+p_{k-1}+p_k)$ obtained as a result thereof is output as an output value.

Here, since the position node $p_i$ corresponds to a position of a foreground in an image, in FIG. 6, ideally, among the eight position nodes $p_1$ to $p_8$ (in the x direction), only an input value of the position node $p_i$ indicating a position of a foreground (here, a single foreground) present in an image given to the image layer is, for example, 1 (the position node $p_i$ is fired best), and input values of the other position nodes are, for example, 0.

Therefore, here, it is assumed that, among the eight position nodes $p_1$ to $p_8$, only an input value of the position node $p_i$ indicating a position of a foreground present in an image given to the image layer is 1, and input values of the other position nodes are 0.

Further, in the following, for simplicity of description, an input value and an output value of the position node $p_i$ are the same, that is, an input value of the position node $p_i$ is output as an output value as is.

In this case, in relation to three output values $p_{k-2}$, $p_{k-1}$ and $p_k$ of the position nodes used to obtain the output value $1-(p_{k-2}+p_{k-1}+p_k)$ of the background node $b_k$, there is a case where all of the three output values $p_{k-2}$, $p_{k-1}$ and $p_k$ are 0, and a case where only one of the three output values $p_{k-2}$, $p_{k-1}$ and $p_k$ is 1 and the other two are 0.

In the case where all of the three output values $p_{k-2}$, $p_{k-1}$ and $p_k$ are 0, the output value $1-(p_{k-2}+p_{k-1}+p_k)$ of the background node $b_k$ becomes 1, and, in a case where only one of the three output values $p_{k-2}$, $p_{k-1}$ and $p_k$ is 1 (the other two are 0), the output value $1-(p_{k-2}+p_{k-1}+p_k)$ of the background node $b_k$ becomes 0.

The output value of the background node $b_k$ is input to each pixel node.

In relation to the pixel node $v_k$, as described with reference to FIG. 5, since the weight w1 between the pixel node and the position node and the weight w3 between the pixel node and the background node are constrained, substantially, only an output value of each of the position nodes $p_{k-2}$, $p_{k-1}$ and $p_k$ and an output value of the background node $b_k$ are input.

In the pixel node $v_k$, weighted sum of an input to the pixel node $v_k$ is performed, and a calculation of a predetermined function having a weighted sum value obtained as a result of the weighted sum as an argument is performed. In addition, in the pixel node $v_k$, the calculation of the predetermined function is output as an output value of the pixel node $v_k$.

Here, as described above, only an output value of each of the position nodes $p_{k-2}$, $p_{k-1}$ and $p_k$ and an output value of the background node $b_k$ are input to the pixel node $v_k$.

Therefore, a weighted sum value obtained in the pixel node $v_k$ is $w1_{k-2,k}p_{k-2}+w1_{k-1,k}p_{k-1}+w1_{k,k}p_k+w3_{k,k}b_k$.

In the pixel node $v_k$, as a predetermined function having weighted sum value as an argument, for example, a hyperbolic tangent tan h is calculated, and a calculation value obtained as a result thereof is output as an output value.

An image which has the output value of the pixel node $v_k$ as a pixel value is an image in which a foreground is present at a position which is predicted from position information given to the foreground layer as an input value and is indicated by the position information in the appearance/position recognition network, and is hereinafter also referred to as a prediction image.

In the network learning portion 17 (FIG. 2), weights $w1_{i,k}$ and $w3_{k,k}$ of the prediction image for reducing an error for an image (hereinafter, also referred to as a learning image) as learning data and position information as an input value (an input value of the position node $p_i$) to the foreground layer are obtained according to the BP method. In addition, the weight $w2_{i,k}$ is fixed to $-1$ or 0 as described with reference to FIG. 5, and thus is not necessary to obtain (that is, already obtained).

According to the BP method, an error of an output value of the pixel node $v_k$ which is a pixel value of the prediction image for a corresponding pixel value of the learning image is obtained, the error is reversely propagated, and thereby weights $w1_{i,k}$ and $w3_{k,k}$ for reducing the error and position information as an input value of the position node $p_i$ are obtained.

In addition, although, in the BP method for learning a normal neural network, an error is reversely propagated and a weight is updated so as to reduce the error, in the learning of the appearance/position recognition network, in addition to the weights $w1_{i,k}$ and $w3_{k,k}$, position information as an input value of the position node $p_i$ is also updated so as to reduce an error. The update of position information as an input value of the position node $p_i$ is performed in the same manner as update of the weights $w1_{i,k}$ and $w3_{k,k}$ (an update amount of the position information is determined in the same manner as updating weights $w1_{i,k}$ and $w3_{k,k}$ in the BP method).

Here, as described above, in relation to three output values $p_{k-2}$, $p_{k-1}$ and $p_k$ of the position node, there is a case where all of the three output values $p_{k-2}$, $p_{k-1}$ and $p_k$ are 0, and a case where only one of the three output values $p_{k-2}$, $p_{k-1}$ and $p_k$ is 1 and the other two are 0.

Now, for simplicity of description, assuming that the pixel node $v_k$ outputs a weighted sum value of inputs to the pixel node $v_k$ as an output value of the pixel node $v_k$ as it is, in a case where, for example, only the output value $p_k$ which is one of the three output values $p_{k-2}$, $p_{k-1}$ and $p_k$ is 1, and the other two output values $p_{k-2}$ and $p_{k-1}$ are 0, an output value of the pixel node $V_k$ becomes $w1_{k-2,k}p_{k-2}+w1_{k-1,k}p_{k-1}+w1_{k,k}p_k+w3_{k,k}b_k=w1_{k,k}+w3_{k,k}b_k$.

In addition, in a case where only one of the three output values $p_{k-2}$, $p_{k-1}$ and $p_k$ is 1 (the other two are 0), as described above, the output value $(1-(p_{k-2}+p_{k-1}+p_k))$ of the background node $b_k$ becomes 0. Therefore, as a result, the output value $w1_{k,k}+w3_{k,k}b_k$ of the pixel node $v_k$ becomes $w1_{k,k}$.

Here, although only the output value $p_k$ which is one of the three output values $p_{k-2}$, $p_{k-1}$ and $p_k$ is 1, and the other two output values $p_{k-2}$ and $p_{k-1}$ are 0, in a case where only the output value $p_{k-1}$ is 1, the output value of the pixel node $v_k$ becomes and in a case where only the output value $p_{k-2}$ is 1, the output value of the pixel node $v_k$ becomes $w1_{k-2,k}$.

On the other hand, in a case where all of the three output values $p_{k-2}$, $p_{k-1}$ and $p_k$ are 0, an output value of the pixel node $v_3$ becomes $w1_{k-2,k}p_{k-2}+w1_{k-1,k}p_{k-1}+w1_{k,k}p_k+w3_{k,k}b_k=w3_{k,k}b_k$.

In addition, in a case where all of the three output values $p_{k-2}$, $p_{k-1}$ and $p_k$ are 0, as described above, the output value $(1-(p_{k-2}+p_{k-1}+p_k))$ of the background node $b_k$ becomes 1. Therefore, as a result, the output value $w3_{k,k}b_k$ of the pixel node $v_k$ becomes $w3_{k,k}$.

As described above, in the learning of the appearance/position recognition network, the weights $w1_{i,k}$ and $w3_{k,k}$ and position information as an input value of the position node $p_i$, for reducing an error of the prediction image for the learning image, are obtained according to the BP method, and, as the weights $w1_{i,k}$ and $w3_{k,k}$ for reducing an error of the prediction image for the learning image, the weights $w1_{i,k}$ and $w3_{k,k}$ on which appearances of a foreground and a background of the learning image are reflected are obtained. In addition, as position information (hereinafter, also referred to as error minimizing position information) for reducing an error of the prediction image for the learning image, position information indicating a position of a foreground of the learning image is obtained.

Now, for example, it is assumed that an object (foreground) is impressed on pixels corresponding to the pixel nodes $v_3$, $v_4$ and $v_5$ of a learning image, and position information indicating a position of the foreground of the learning image is given to the foreground layer. In other words, in the learning image where an object (foreground) is impressed on pixels corresponding to the pixel nodes $v_3$, $v_4$ and $v_5$, it is assumed that, ideally, position information of the value 1 is input to the position node $p_3$ corresponding to a central position of the range R' of the pixels corresponding to the pixel nodes $v_3$, $v_4$ and $v_5$ as an input value, and position information of the value 0 is input to the other position nodes $p_1$, $p_2$, and $p_4$ to $p_8$ as an input value.

In this case, an output value of the position node $p_3$ corresponding to a central position of the range R' of the pixels corresponding to the pixel nodes $v_3$, $v_4$ and $v_5$ becomes 1, and output values of the other position nodes $p_1$, $p_2$, and $p_4$ to $p_8$ become 0.

As a result, output values of the background nodes $b_3$, $b_4$ and $b_5$ become 0, and output values of the other background nodes $b_1$, $b_2$, and $b_6$ to $b_{10}$ become 1.

The respective output values of the pixel nodes $v_1$, $v_2$, $v_6$, $v_7$, $v_8$, $v_9$ and $v_{10}$ corresponding to the background nodes $b_1$, $b_2$, $b_6$, $b_7$, $b_8$, $b_9$ and $b_{10}$ of which the output values are 1 become the weights $w3_{1,1}$, $w3_{2,2}$, $w3_{6,6}$, $w_{7,7}$, $w3_{8,8}$, $w3_{9,9}$ and $w3_{10,10}$, as described above.

In addition, the respective output values of the pixel nodes $v_3$, $v_4$ and $v_5$ corresponding to the background nodes $b_3$, $b_4$ and $b_5$ of which the output values are 0 become the weights $w1_{3,3}$, $w1_{3,4}$ and $w1_{3,5}$, as described above.

In this case, in the learning image, the foreground is impressed on the pixels corresponding to the pixel nodes $v_3$, $v_4$ and $v_5$, and the background is impressed on the pixels corresponding to the pixel nodes $v_1$, $v_2$, $v_6$, $v_7$, $v_8$, $v_9$ and $v_{10}$.

Since, in the network learning portion 17 (FIG. 2), the weights $w1_{i,k}$ and $w3_{k,k}$ for reducing an error of the prediction image having an output value of the pixel node $v_k$ as a pixel value for the learning image is obtained according to the BP method, the foreground (object) is reflected on the weights $w1_{3,3}$ $w1_{3,4}$ and $w1_{3,5}$, and the background is reflected on the weights $w3_{1,1}$, $w3_{2,2}$, $w3_{6,6}$, $w3_{7,7}$, $w3_{8,8}$, $w3_{9,9}$ and $w3_{10,10}$.

In other words, in the learning of the appearance/position recognition network, pixel values of the pixels, on which the foreground is impressed, corresponding to the pixel nodes $v_3$, $v_4$ and $v_5$ are respectively obtained in the weights $w1_{3,3}$ $w1_{3,4}$ and $w1_{3,5}$, and pixel values of the pixels, on which the background is impressed, corresponding to the pixel nodes $v_1$, $v_2$, $v_6$, $v_7$, $v_8$, $v_9$ and $v_{10}$ are respectively obtained in the weights $w3_{1,1}$, $w3_{2,2}$, $w3_{6,6}$, $w3_{7,7}$, $w3_{8,8}$, $w3_{9,9}$ and $w3_{10,10}$.

Further, as above, on the premise that position information indicating a position of the foreground of the learning image is given to the foreground layer, that is, in the learning image where the object (foreground) is impressed on the pixels corresponding to the pixel nodes $v_3$, $v_4$ and $v_5$, ideally, position information of the value 1 is input to the position node $p_3$ corresponding to a central position of the range R' of the pixels corresponding to the pixel nodes $v_3$, $v_4$ and $v_5$, and position information of the value 0 is input to the other position nodes $p_1$, $p_2$, and $p_4$ to $p_8$, an error of the prediction image for the learning image is reduced, and thereby the foreground (object) is reflected on the weights $w1_{3,3}$ $w1_{3,4}$ and $w1_{3,5}$, and the background is reflected on the weights $w3_{1,1}$, $w3_{2,2}$, $w3_{6,6}$, $w3_{7,7}$, $w3_{8,8}$, $w3_{9,9}$ and $w3_{10,10}$.

Therefore, in order to obtain the weights $w1_{3,3}$ $w1_{3,4}$ and $w1_{3,5}$ on which the foreground is reflected and the weights $w3_{1,1}$, $w3_{2,2}$, $w3_{6,6}$, $w3_{7,7}$, $w3_{8,8}$, $w3_{9,9}$ and $w3_{10,10}$ on which the background is reflected by reducing an error of the prediction image for the learning image, it is necessary for position information given to the foreground layer to be position information indicating a position of the foreground of the learning image, that is, in this case, it is necessary for position information as an input value input to the position node $p_3$ corresponding to the position of the foreground of the learning image to be 1 and for position information as input values input to the other position nodes $p_1$, $p_2$, and $p_4$ to $p_8$ to be 0.

From the above description, the weights $w1_{i,k}$ and $w3_{k,k}$ and position information as an input value of the position node $p_i$ are updated so as to reduce an error of the prediction image for the learning image according to the BP method, and thereby the weights $w1_{i,k}$ and $w3_{k,k}$ become values on which a foreground and a background of the learning image are reflected and the position information becomes a value indicating a position of the foreground of the learning image.

Since the weights w1 to w3 are constrained as described with reference to FIG. 5, the appearance/position recognition network is learned using an image (an image where appearances of a foreground and a background are the same) where a foreground is impressed on various positions as a learning image, and thereby an appearance of the foreground is acquired in the weight $w1_{i,k}$ and an appearance of the background is acquired in the weight $w3_{k,k}$.

Further, in relation to the weight w1 as described with reference to FIG. 5, a weight $w1_{i,i+C}$ between a pixel node $v_{i+C}$ corresponding to a pixel in an image located at a position having a predetermined positional relationship C from a position corresponding to a certain position node $p_i$ and the position node $p_i$, and a weight $w1_{i',i'+C}$ between a pixel node $v_{i'+C}$ corresponding to a pixel in the image located at a position having the same positional relationship C from a position corresponding to another position node $p_{i'}$ and another position node $p_{i'}$, are constrained to the same value, and thus the same foreground appearance is obtained in the weight w1 between each of the position nodes of the foreground layer and the pixel node (the same foreground appearance is obtained in the weight w1 between an arbitrary position node $p_i$ and the pixel node and the weight w1 between another position node $p_i$ and the pixel node).

As described above, in the (learned) appearance/position recognition network where the appearance of the foreground has been acquired in the weight $w1_{i,k}$ and the appearance of the background has been acquired in the weight $w3_{k,k}$, if, for example, only the position node $p_3$ of the position nodes $p_1$ to $p_8$ is fired, that is, only position information input to the position node $p_3$ is set to 1 and position information input to the other position nodes $p_1$, $p_2$, and $p_4$ to $p_8$ is set to 0 (an output value of only the position node $p_3$ becomes 1), the weights $w1_{3,3}$, $w1_{3,4}$ and $w1_{3,5}$ in which the appearance of the foreground has been acquired are transmitted from the fired position node $p_3$ to the pixel nodes $v_3$, $v_4$ and $v_5$ corresponding to pixels in a range R' of the foreground centering on a position corresponding to the fired position node $p_3$.

On the other hand, in the background layer, the background nodes $b_3$, $b_4$ and $b_5$ corresponding to pixels (background) in the range R' of the foreground centering on the position corresponding to the fired position node $p_3$ are suppressed from being fired. In other words, output values of the background nodes $b_3$, $b_4$ and $b_5$ become 0.

In a case where the output values of the background nodes $b_3$, $b_4$ and $b_5$ are 0, the weights $w3_{3,3}$ $w3_{3,4}$ and $w3_{3,5}$ in which the appearance of the background has been acquired are not transmitted from the background nodes $b_3$, $b_4$ and $b_5$ to the respectively corresponding pixel nodes $v_3$, $v_4$ and $v_5$.

From the above description, the foreground of which the appearance has been acquired in the weights $w1_{3,3}$ $w1_{3,4}$ and $w1_{3,5}$ appears at the pixel nodes $v_3$, $v_4$ and $v_5$ corresponding to the pixels in the range R' of the foreground.

In addition, in a case where (only) the position node $p_3$ is fired, information transmission from the foreground layer to the pixel nodes $v_1$, $v_2$ and $v_6$ to $v_{10}$ corresponding to pixels other than the pixels in the range R' of the foreground centering on the position corresponding to the fired position node $p_3$ is suppressed.

On the other hand, in the background layer, the background nodes $b_3$, $b_4$ and $b_5$ corresponding to pixels (background) in the range R' of the foreground centering on the position corresponding to the fired position node $p_3$ are suppressed from being fired, but the other background nodes $b_1$, $b_2$ and $b_6$ to $b_{10}$ are fired. In other words, output values of the background nodes $b_1$, $b_2$ and $b_6$ to $b_{10}$ become 1.

In a case where the output values of the background nodes $b_1$, $b_2$ and $b_6$ to $b_{10}$ are 1, the weights $w3_{1,1}$, $w3_{2,2}$ and $w3_{6,6}$ to $w3_{10,10}$ in which the appearance of the background has been acquired are transmitted to the respectively corresponding pixel nodes $v_1$, $v_2$ and $v_6$ to $v_{10}$ from the background nodes $b_1$, $b_2$ and $b_6$ to $b_{10}$.

From the above description, the background of which the appearance has been acquired in the weights $w3_{1,1}$, $w3_{2,2}$ and $w3_{6,6}$ to $w3_{10,10}$ appears at the pixel nodes $v_1$, $v_2$ and $v_6$ to $v_{10}$ corresponding to the pixels out of the range R' of the foreground.

Therefore, in the (learned) appearance/position recognition network, when the position information of the foreground is given to the foreground layer, it is possible to obtain an image in which the foreground of which the appearance has been acquired in the weight w1 is superimposed at the position indicated by the position information given to the foreground layer on the background of which the appearance has been acquired in the weight w3, that is, a prediction image for predicting an image in which the foreground is present at the position indicated by the position information given to the foreground layer from the image layer.

Further, according to the (learned) appearance/position recognition network, since the weights w1 to w3 are fixed to values obtained through the learning, and position information (error minimizing position information) for reducing an error of the prediction image, which is obtained from the image layer by giving position information to the foreground layer, for an image (input image) input to the appearance/position recognition network is obtained according to the BP method, it is possible to obtain position information indicating a position of a foreground on the input image (a position of the foreground can be recognized).

Here, in relation to the position information given to the foreground layer, ideally, only position information input to the a position node corresponding to the position of the foreground as an input value is 1, and position information input to the other position nodes as an input value is 0, that is, ideally, in the position nodes forming the foreground layer, only an output value of a single position node is 1 (fired best), and output values of the other position nodes are 0; however, such ideal input values (position information) of the position nodes are not necessarily obtained in the BP method.

For this reason, in recognition of a position of a foreground using the appearance/position recognition network, for example, among position nodes forming the foreground layer, a position in which position information (error minimizing position information) as an input value, obtained according to the BP method, corresponds to the maximum position node may be used as a final recognition result of a position of a foreground.

In addition, in an input image for the appearance/position recognition network, as an input value of a position node of which an input value which is position information obtained through the recognition of a position of a foreground is the maximum becomes close to 1 and an input value of the other position nodes becomes close to 0, a foreground and a background of the input image are respectively the foreground of which the appearance has been acquired in the weight w1 and the background of which the appearance has been acquired in the weight w3, and, there is a high probability that the foreground is present at a position corresponding to the position node of which an input value is the maximum.

On the other hand, in a case where an input value of a position node of which an input is the maximum is not close to 1, or an input value of a position node of which an input value is not the maximum is not close to 0, there is a high probability that a foreground and a foreground of the input image are not the foreground of which the appearance has been acquired in the weight w1 or the background of which the appearance has been acquired in the weight w3.

Therefore, according to the appearance/position recognition network, a position of a foreground of the input image can be recognized, and it can be recognized whether a foreground and a foreground of the input image are respectively the foreground of which the appearance has been acquired in the weight w1 and the background of which the appearance has been acquired in the weight w3.

As described above, learning of the appearance/position recognition network in which the position nodes of the foreground layer, the background nodes of the background layer, and the pixel nodes of the image layer are connected to each other is performed by constraining the weight w1 between the position node and the pixel node, the weight w2 between the position node and the background node, and the weight w3 between the background node and the pixel node, and thereby it is possible to easily perform learning of an object or the like in an environment where the agent performs actions.

That is to say, it is possible to acquire appearances of a background and a foreground (object) in an image from only the image in the appearance/position recognition network without putting marks on the object or extracting a closed region from the image.

Further, according to the learned appearance/position recognition network, in an image formed by a background and a foreground of which appearances are acquired by the appearance/position recognition network, a position of the foreground can be recognized (position information of the foreground can be obtained) only from the image.

In addition, although the above description has been made on the premise that only a single foreground is included in an image, foregrounds may be included in an image not singly but in a plurality.

Figure 7:
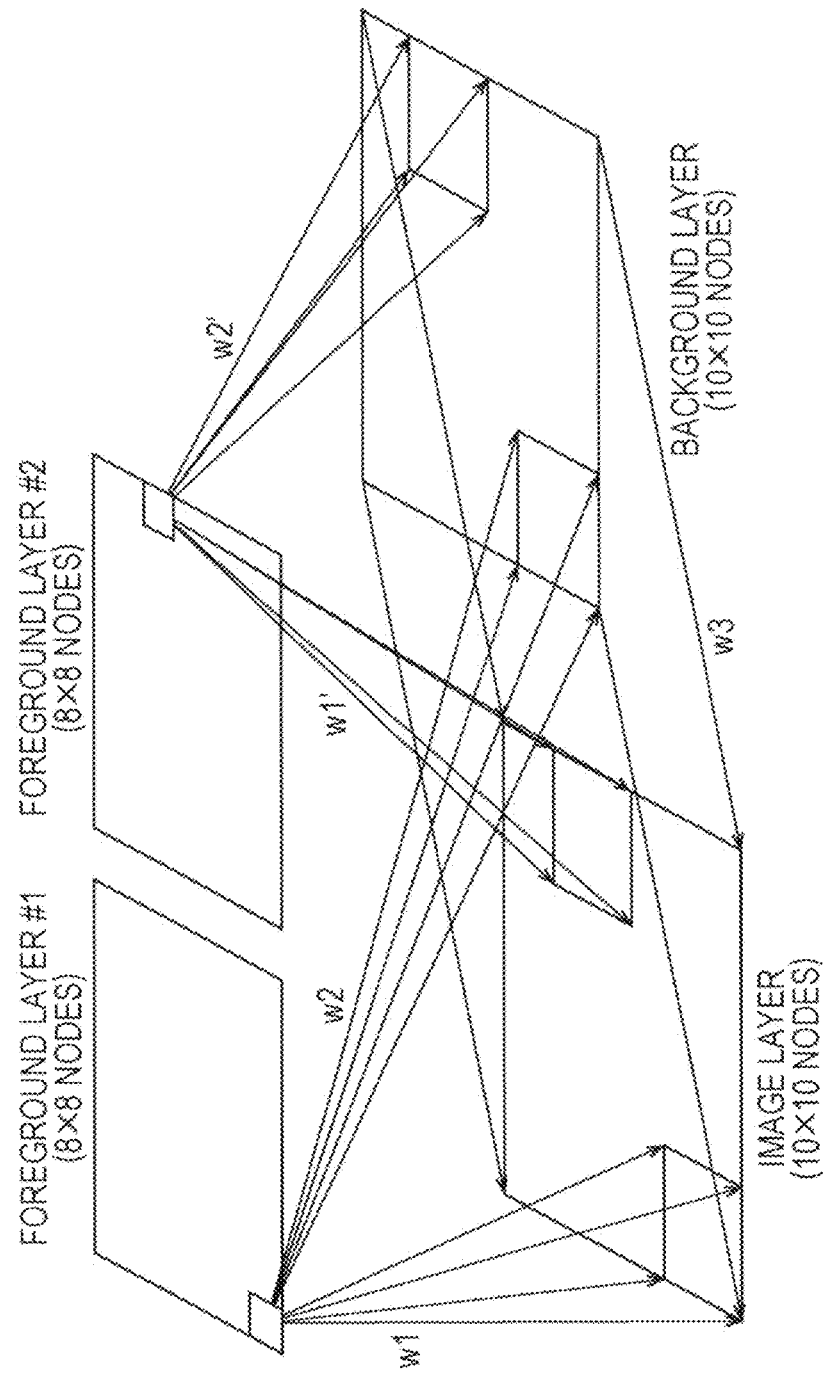
FIG. 7 is a diagram illustrating an example of the appearance/position recognition network for dealing with an image where two foregrounds are superimposed on a background.

FIG. 7 is a diagram illustrating an example of the appearance/position recognition network for dealing with an image in which two (or less) foregrounds are superimposed on a background.

In addition, in FIG. 7, in the same manner as the case of FIG. 4, the image includes 10×10 pixels, and the foreground includes (up to) 3×3 pixels.

In the appearance/position recognition network of FIG. 7, two foreground layers #1 and #2 are provided instead of a single foreground layer of FIG. 4.

In the same manner as the foreground layer of FIG. 4, each of the foreground layers #1 and #2 has 64 (=8×8) position nodes, and the position nodes of the foreground layers #1 and #2 are also connected to background nodes of a background layer and pixel nodes of an image layer in the same manner as the position nodes of the foreground layer of FIG. 4.

However, the position nodes between the foreground layers #1 and #2 are not connected to each other.

As above, in the appearance/position recognition network having the two foreground layers #1 and #2, an appearance of one of the two foregrounds of a learning image is obtained in a weight w1 between the position node of the foreground layer #1 and the pixel node of the image layer by performing the learning using the learning image which includes the two foregrounds, an appearance of the other of the two foregrounds of the learning image is obtained in a weight w1' between the position node of the foreground layer #2 and the pixel node of the image layer, and an appearance of the background of the learning image is obtained in a weight w3 between the background node of the background layer and the pixel node of the image layer.

In addition, in the learning of the appearance/position recognition network having the two foreground layers #1 and #2, the weight w1 between the position node of the foreground layer #1 and the pixel node of the image layer, the weight w1' between the position node of the foreground layer #2 and the pixel node of the image layer, the weight w2 between the position node of the foreground layer #1 and the background node of the background layer, the weight w2' between the position node of the foreground layer #2 and the background node of the background layer, and the weight w3 between the background node of the background layer and the pixel node of the image layer are constrained as described with reference to FIG. 5; however, there is no particular constraint between the weights w1 and w1' and the weights w2 and w2'.

Here, a simulation of the appearance/position recognition network which has been performed by the present inventor will be described.

Figure 8:
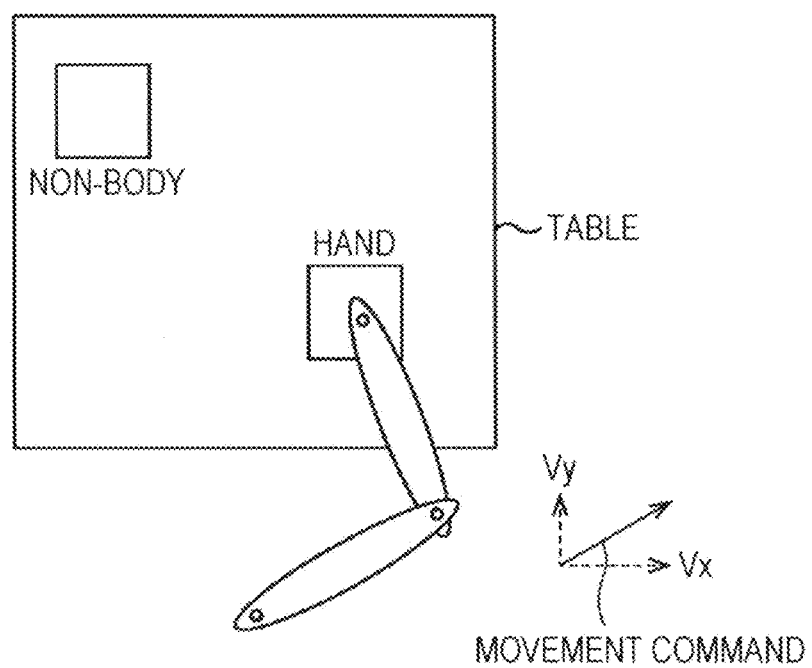
FIG. 8 is a diagram illustrating a movement command employed in a simulation of the appearance/position recognition network.

FIG. 8 is a diagram illustrating a movement command employed in the simulation of the appearance/position recognition network.

In the simulation, a velocity vector $(V_x, V_y)$ for instructing a movement velocity of the hand has been employed as the movement command.

FIG. 9 is a diagram illustrating an example of the learning image used in the simulation.

As described with reference to FIG. 3, the learning image of FIG. 9 is a grayscale image where a foreground of 3×3 pixels is superimposed on a background of 10×10 pixels, and the hand and the non-body which are two objects are impressed thereon as foregrounds.

FIG. 10 is a diagram illustrating an example of the constituent elements of the learning image used for the simulation.

The learning image includes the background, and two foregrounds #1 and #2.

In the simulation, eighty images where the two foregrounds #1 and #2 are disposed so as not to overlap each other at various positions on the background have been used as the learning images, and learning of the appearance/position recognition network in which the two foreground layers #1 and #2 shown in FIG. 7 has been performed.

Here, one of the foregrounds #1 and #2 is the hand, the other is the non-body in the learning image. The hand is moved in response to the velocity vector which is a movement command shown in FIG. 8, and the non-body may be moved by coming into contact with the hand.

Figure 11:
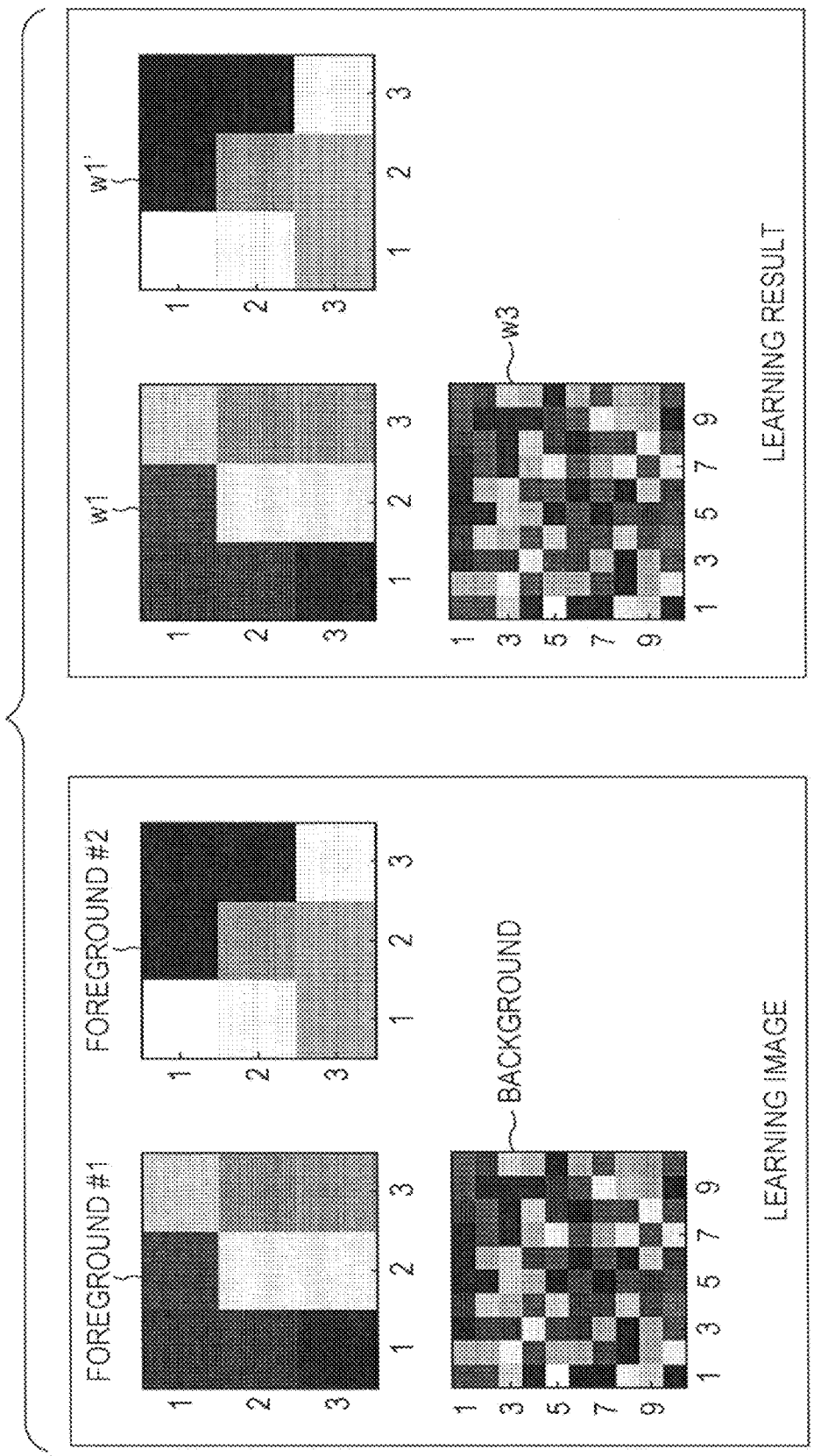
FIG. 11 is a diagram illustrating a result of the simulation of the appearance/position recognition network.

FIG. 11 is a diagram illustrating a result of the simulation of the appearance/position recognition network.

In other words, FIG. 11 shows a background and two foregrounds forming the learning image, and (appearances of) a background and two foregrounds acquired through learning of the appearance/position recognition network using the learning image as a learning result of the appearance/position recognition network of FIG. 7.

In the learning result of the appearance/position recognition network of FIG. 7, an appearance of the background of the learning image is acquired in the weight w3 between each background node and a pixel node corresponding to a pixel of the background corresponding to the background node.

In addition, in the learning result of the appearance/position recognition network of FIG. 7, an appearance of the foreground #1 or #2 of the learning image is acquired in the weight w1 or w1' between any one position node of the foreground layer #1 or #2 and each of nine pixel nodes corresponding to pixels present at nine locations of 3×3 centering on a position corresponding to the position node.

As described above, according to the appearance/position recognition network, it is possible to acquire a background and one or more foregrounds separately from each other from the learning image. In addition, according to the appearance/position recognition network, it is possible to recognize a position of a foreground on an image having the same background and foreground appearances as in the learning image.

MTRNN

Next, the MTRNN as an identification network stored in the network storage unit 15 will be described.

The MTRNN is an RNN which has a node group of which a context is updated at different time constants as a node group storing a context which is an internal state, and the MTRNN itself is disclosed in, for example, Y. Yamashita and J. Tani, "Emergence of Functional Hierarchy in a Multiple Timescale Neural Network Model: a Humanoid Robot Experiment," PLoS Comput. Biol., vol. 4, 2008.

Figure 12:
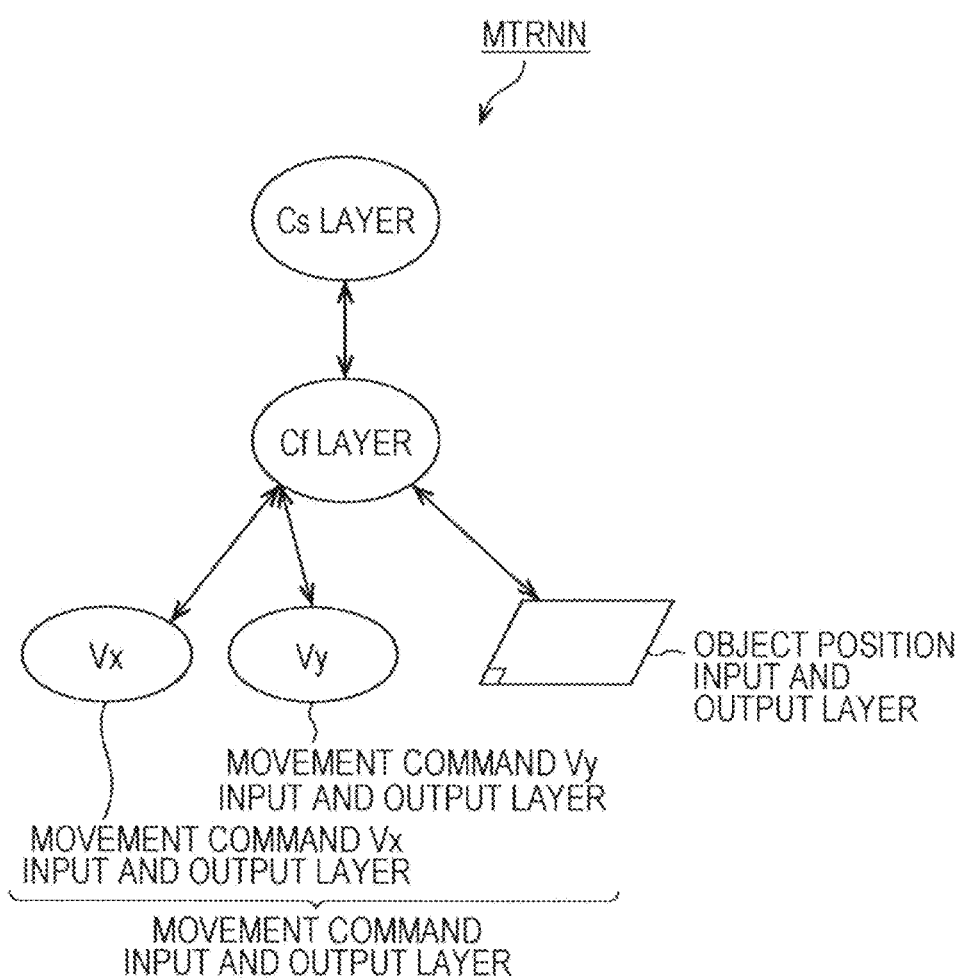
FIG. 12 is a diagram illustrating a configuration example of the MTRNN which is an identification network.

FIG. 12 is a diagram illustrating a configuration example of the MTRNN as an identification network.

In FIG. 12, the MTRNN includes a movement command $V_x$ input and output layer, a movement command $V_y$ input and output layer, an object position input and output layer, a Cf (fast Context) layer (first context layer), and a Cs (slow Context) layer (second context layer).

In FIG. 12, the movement command $V_x$ input and output layer, the movement command $V_y$ input and output layer, and the object position input and output layer are all bidirectionally connected to the Cf layer. The Cf layer is bidirectionally connected to the Cs layer in addition to the movement command $V_x$ input and output layer, the movement command $V_y$ input and output layer, and the object position input and output layer.

Figure 13:
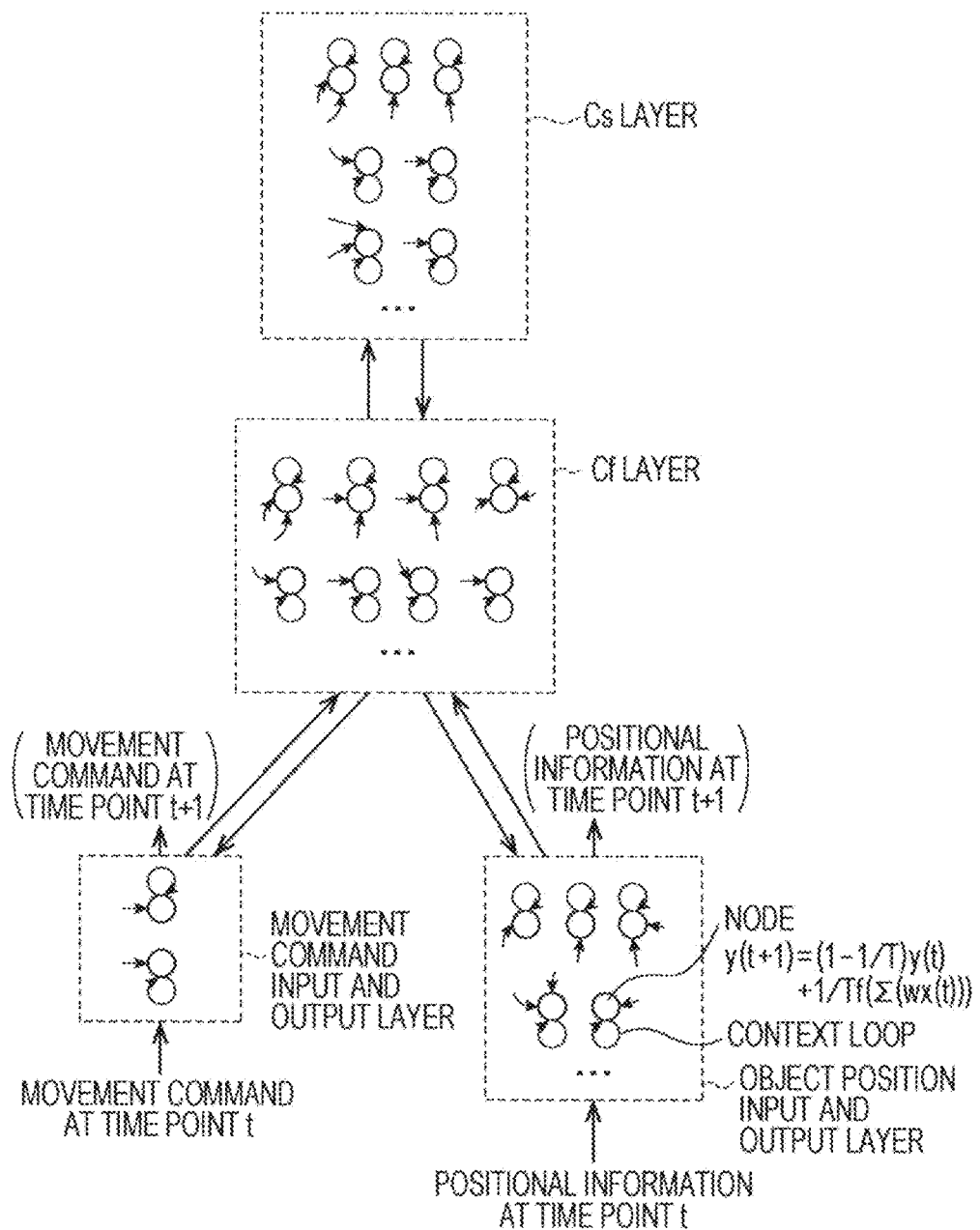
FIG. 13 is a diagram illustrating a more detailed configuration example of the MTRNN.

FIG. 13 is a diagram illustrating a more detailed configuration example of the MTRNN of FIG. 12.

Further, the x component $V_x$ and the y component $V_y$ of the velocity vector $(V_x, V_y)$ are respectively input to and output as a movement command from the movement command $V_x$ input and output layer and the movement command $V_y$ input and output layer, and, hereinafter, appropriately, the movement command $V_x$ input and output layer and the movement command $V_y$ input and output layer are also collectively referred to as a movement command input and output layer.

In FIG. 13, each of the movement command input and output layer, the object position input and output layer, the Cf layer, and the Cs layer of the MTRNN includes one or more nodes.

Each node of the movement command input and output layer and the object position input and output layer is bidirectionally connected to the node of the Cf layer, and, further, the node of the Cf layer is bidirectionally connected to the node of the Cs layer.

In addition, each node of the Cf layer and the Cs layer is connected to the node of the same layer.

The node forming the movement command input and output layer, the object position input and output layer, the Cf layer, and the Cs layer of the MTRNN has a context loop and is a neuron storing a context (updating an internal state).

In other words, if a storage value of a node at the time point t is indicated by y(t), an input to a node at the time point t is indicated by x(t), and a time constant is indicated by T, a node forming each of the movement command input and output layer, the object position input and output layer, the Cf layer, and the Cs layer of the MTRNN stores an internal state of the node updated at the time point t as a storage value y(t). In addition, the node outputs the storage value y(t) to the necessary other nodes, and feeds the storage value y(t) back to the node itself (self) through the context loop, thereby updating a storage value y(t+1) of the node at the time point t+1 according to the expression $y(t+1)=(1-1/T)y(t)+1/Tf(\Sigma w_i x_i(t))$.

Here, in the expression $y(t+1)=(1-1/T)y(t)+1/Tf(\Sigma w_i x_i(t))$, f( ) is a predetermined differentiable function such as, for example, a sigmoid function or a hyperbolic tangent tanh.

In addition, in the expression $y(t+1)=(1-1/T)y(t)+1/Tf(\Sigma w_i x_i(t))$, $x_i(t)$ indicates an i-th input of inputs (inputs to a node when the storage value y(t) is fed back to the node) to the node at the time point t, and $w_i$ indicates a weight (connection weight) with a node which outputs an input $x_i(t)$. In addition, $\Sigma$ indicates summation taken by changing the index i to integers in a range from 1 to a total number N of the inputs to the node.

In the node of the movement command input and output layer, a movement command given from an external device or an output (a storage value updated according to the expression $y(t+1)=(1-1/T)y(t)+1/Tf(\Sigma w_i x_i(t))$) of the node of the Cf layer is an input $x_i(t)$ to the node.

In the node of the object position input and output layer, position information given from an external device or an output (a storage value) of the node of the Cf layer is an input $x_i(t)$ to the node.

In the node of the Cf layer, an output of the node other than the Cf layer, an output of the node of the movement command input and output layer, an output of the node of the object position input and output layer, or an output of the node of the Cs layer is an input $x_i(t)$ to the node.

In the node of the Cs layer, an output of the node other than the Cs layer, or an output of the node of the Cf layer is an input $x_i(t)$ to the node.

According to the expression $y(t+1)=(1-1/T)y(t)+1/Tf(\Sigma w_i x_i(t))$, it is possible to adjust an extent of the storage value y(t) in the past influencing a storage value y(t+1) of a node depending on the time constant T.

In other words, as the time constant T, a value which is equal to or larger than 1 may be set.

If the time constant T is great, the storage value y(t) in the past considerably influences the storage value y(t+1) of a node, and, as a result, the storage value y(t+1) of the node slowly varies for a long time, as it were, as if the storage value y(t) in the past is trailed.

On the other hand, if the time constant T is small, the storage value y(t+1) of the node is less influenced by the storage value y(t) in the past and is thus easily influenced by an input $x_i(t)$ to the node.

In addition, if the time constant T is 1, in the node, a storage value y(t+1) which is not influenced by the storage value y(t) in the past is obtained using an input $x_i(t)$ to the node in the same manner as an NN (Neural Network) having no context loops.

The movement command input and output layer includes, for example, two nodes, and, for example, 2 is set as the time constant T. The nodes of the movement command input and output layer perform information transmission with the nodes of the Cf layer inside the MTRNN. The x component $V_X$ and the y component $V_y$ of the velocity vector $(V_X, V_Y)$ are input to and output as a movement command from the nodes of the movement command input and output layer with outside of the MTRNN.

The object position input and output layer has nodes of 64 (=8×8) which is the same as the number of position nodes forming the foreground layer of the appearance/position recognition network (FIG. 4), and, for example, 1 is set as the time constant T. The nodes of the object position input and output layer perform information transmission with the nodes of the Cf layer inside the MTRNN. With the outside of the MTRNN, 8×8 pieces of position information are input to and output from the nodes of the object position input and output layer with outside of the MTRNN, in the same manner as being input to and output from 8×8 position nodes of the foreground layer of the appearance/position recognition network.

The Cf layer has nodes of about 10 which is a value in a range of, for example, about 10 to 80, and, for example, 4 is set as the time constant T. The nodes of the Cf layer perform information transmission with the nodes of each of the movement command input and output layer, the object position input and output layer, and the Cs layer, and nodes other than the Cf layer.

The Cs layer has nodes of about 16 which is a value in a range of, for example, about 4 to 32, and, as the time constant T, for example, 70 which is greater than the time constant of the Cf layer is set. The nodes of the Cs layer perform information transmission with the nodes of the Cf layer and nodes other than the Cs layer.

Here, the time constant T of the Cf layer is 4, and thus the storage value y(t+1) of the node of the Cf layer is influenced by the storage value y(t) in the past and thereby slowly varies to a degree.

In addition, the storage value y(t+1) of the node of the Cs layer of which the time constant T is 70 greater than that of the Cf layer is considerably influenced by the storage value y(t) in the past, and thus very slowly varies.

The MTRNN has nodes (groups) of which a variation speed (time axis) of the storage value y(t+1) is different such as the nodes of each of the Cf layer and the Cs layer.

Here, in the MTRNN, in FIG. 13, information transmission upward from the bottom (information transmission to the Cf layer and further to the Cs layer from the movement command input and output layer or the object position input and output layer) and information transmission downward from the top (information transmission to the Cf layer and further to the movement command input and output layer or the object position input and output layer from the Cs layer) may be performed.

In the information transmission of the MTRNN, the information transmission upward from the bottom is also referred to as upward transmission, and the information transmission downward from the top is also referred to as downward transmission.

Figure 14C:
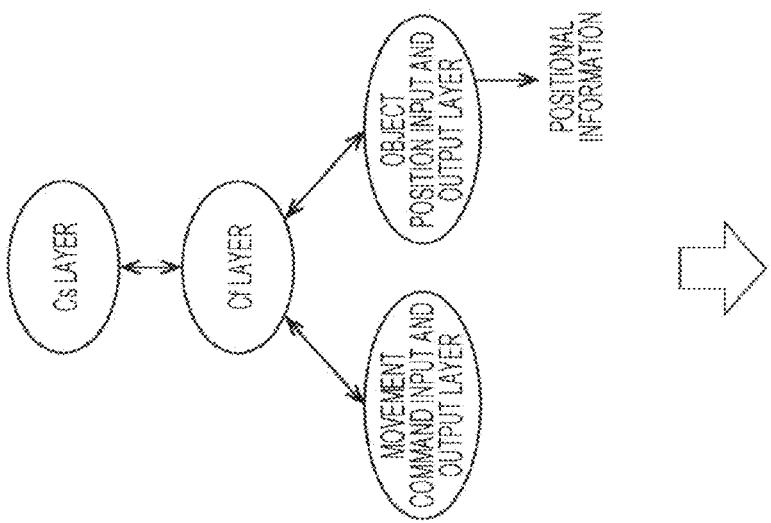
FIGS. 14A to 14C are diagrams illustrating processes of learning of the MTRNN, and recognition and generation using the MTRNN.
Figure 14B:
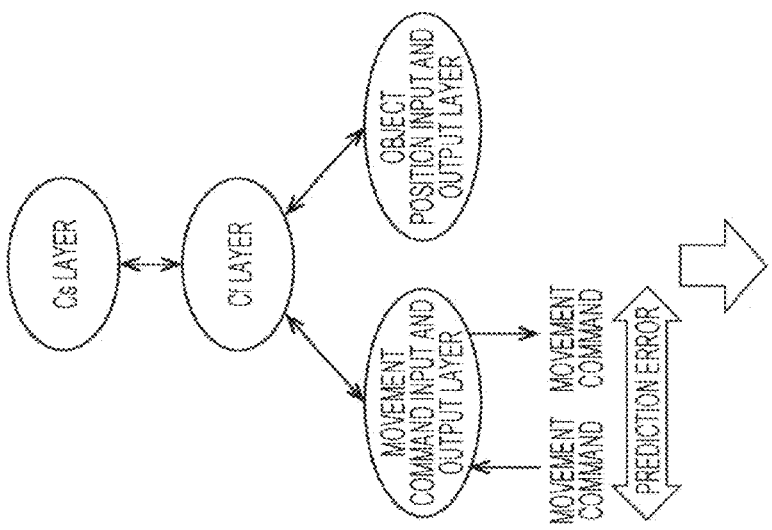
Figure 14A:
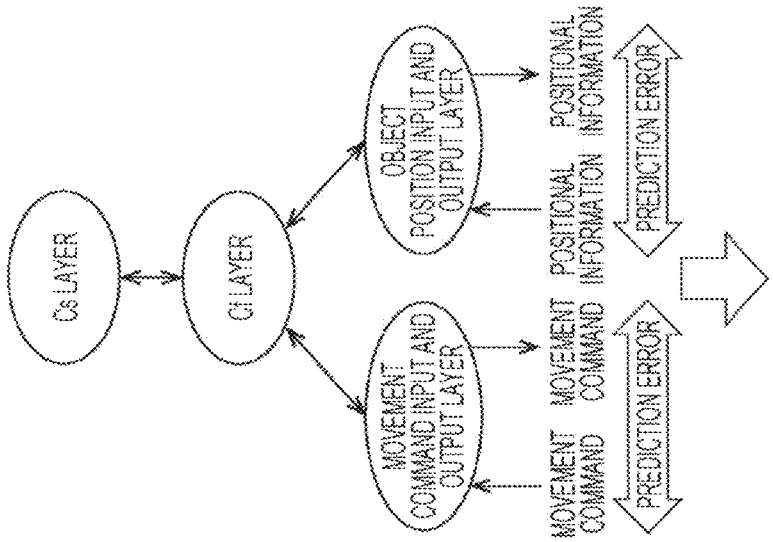

FIGS. 14A to 14C are diagrams illustrating processes of learning of the MTRNN, and recognition and generation using the MTRNN.

In other words, the FIG. 14A is a diagram illustrating learning of the MTRNN, FIG. 14B is a diagram illustrating recognition using the MTRNN, and FIG. 14C is a diagram illustrating generation using the MTRNN.

First, learning of the MTRNN will be described with reference to FIG. 14A.

In the learning of the MTRNN, the weight $w_i$ in the expression $y(t+1)=(1-1/T)y(t)+1/Tf(\Sigma w_i x_i(t))$ for updating the storage value y(t+1) of a node of the MTRNN, that is, a weight between connected nodes of the MTRNN and an initial value of a storage value (context) of a node of the Cs layer are obtained.

The MTRNN learning portion 18 (FIG. 2) performs learning of the MTRNN by using a sequence of sets of movement commands and images stored in the data storage unit 14 in correlation with each other as learning data of the MTRNN.

In addition, an image as the learning data of the MTRNN is assumed as an image having the same background and foreground as the learning image used for learning the appearance/position recognition network (FIG. 4).

The MTRNN learning portion 18 inputs a sequence of images (of a sequence of sets of movement commands and images) as learning image data to the appearance/position recognition network, and, in the appearance/position recognition network, in relation to each image (input image) of the sequence of images input thereto, obtains input values (position information for reducing an error of a prediction image, which has an output value output from a pixel node by inputting position information to a position node as a pixel value, for the input image) of 8×8 position nodes forming a foreground, obtained as a result of recognition of positions of the foreground.

Here, the position information obtained in the appearance/position recognition network in the above-described way indicates a position of an object impressed on the image (immediately after) when a movement command is issued in the agent.

The MTRNN learning portion 18 correlates each movement command of the sequence of movement commands as learning data of the MTRNN with position information as the recognition result of the position of the foreground obtained from the movement command and an image which is correlated with the movement command, so as to be included in the learning data of the MTRNN. In addition, the MTRNN learning portion 18 performs learning of the MTRNN according to, for example, a BPTT (Back Propagation Through Time) method which is one of learning algorithms of an RNN, by using the learning data of the MTRNN.

In other words, the MTRNN learning portion 18 gives (inputs) a movement command at each time point t as the learning data of the MTRNN to the node of the movement command input and output layer, and gives position information correlated with the movement command to the node of the object position input and output layer. In the MTRNN, upward transmission is performed, and, then, downward transmission is performed. As a result, a prediction value of a movement command at the next time point t+1 is stored in the node of the movement command input and output layer, and a prediction value of position information at the next time point t+1 is stored in the node of the object position input and output layer.

In addition, the MTRNN learning portion 18 obtains a weight $w_i$ and an initial value of a storage value (context) of the node of the Cs layer for reducing a prediction error of the prediction value of the movement command at the time point t+1 and a prediction error of the prediction value of the position information at the time point t+1 to, for example, a predetermined threshold value or less.

In addition, as an initial value of the storage value (context) of the node of the Cs layer, for example, 0 is used.

In addition, since a storage value of the node of the MTRNN is not set to an appropriate value immediately after the learning of the MTRNN starts, in the MTRNN learning portion 18, prediction values of movement commands and position information obtained for several time points such as, for example, four time points immediately after the learning of the MTRNN starts are not used (disregarded) to obtain a weight $w_i$ and an initial value of a storage value (context) of the node of the Cs layer.

With reference to FIG. 14B, recognition using the (learned) MTRNN will be described.

In the recognition using the MTRNN, for example, a movement command is recognized.

The recognition generating unit 19 (FIG. 2) extracts a sequence of movement commands from a sequence of sets of movement commands and images stored in the data storage unit 14 in correlation with each other, sets the sequence of movement commands as a recognition target, and performs recognition of the sequence of movement commands (hereinafter, also referred to as target movement commands) which are recognition targets by using, for example, the BPTT method.

In other words, the recognition generating unit 19 gives the target movement command at each time point t to the node of the movement command input and output layer. In the MTRNN, upward transmission is performed, and, then downward transmission is performed. As a result, a prediction value of the target movement command at the next time point t+1 is stored in the node of the movement command input and output layer.

In addition, the recognition generating unit 19 obtains an initial value of a storage value (context) of the node of the Cs layer for reducing a prediction error of the prediction value of the target movement command at the time point t+1 to, for example, a predetermined threshold value or less, in a state where the weight $w_i$ of the MTRNN obtained through the learning is fixed.

An initial value of a storage value (context) of the node of the Cs layer for reducing a prediction error of the prediction value of the target movement command is a recognition result (of a sequence) of the target movement commands, and is hereinafter also referred to as a unique initial value.

With reference to FIG. 14C, generation using the (learned) MTRNN will be described.

In the generation using the MTRNN, for example, a prediction value of position information indicating a position of an object (here, the hand of the agent) moved in response to a movement command is generated when the movement command is issued.

The recognition generating unit 19 (FIG. 2) gives (sets the unique initial value as a storage value of the node) the unique initial value obtained as a result of the recognition of the target movement command as an initial value (hereinafter, referred to as a Cs initial value) of the node of the Cs layer of the MTRNN. In the MTRNN, downward transmission is performed, and, as a result, when a target movement command is issued, a prediction value of position information of an object moved in response to the target movement command is stored and output in the node of the object position input and output layer.

FIG. 15 is a diagram illustrating a result of a simulation for the MTRNN of FIGS. 14A to 14C performed by the present inventor.

In the simulation of the MTRNN, a sequence of movement commands of 180 patterns and a sequence of position information of an object moved in response to each movement command have been prepared as learning data of the MTRNN of 180 patterns, and learning of the MTRNN has been performed.

The position information as learning data is 8×8 values corresponding to storage values of 8×8=64 nodes (and 8×8=64 position nodes of the foreground layer of the appearance/position recognition network) of the object position input and output layer of the MTRNN, and, for example, of the 64 (=8×8) values as position information, only a value corresponding to a position at which the object is present is 1, the other 63 values are 0.

In the simulation, in addition to the learning data of the MTRNN as described above, learning data (hereinafter, also referred to as corrected learning data) including corrected position information where position information of the learning data is corrected instead of position information before being corrected has been prepared, and learning of separate MTRNNs with the same configuration has been performed using the learning data and the corrected learning data.

Hereinafter, the MTRNN of which learning has been performed using the (non-corrected) learning data is also referred to as a non-corrected MTRNN, and the MTRNN of which learning has been performed using the corrected learning data is also referred to as a corrected MTRNN.

The correction of position information has been performed according to the following three rules R1, R2 and R3:

(R1) The maximum value and an adjacent values are adjusted such that the maximum value of 8×8 values is twenty times greater than the adjacent values which are values of positions adjacent to a position of the maximum value.

(R2) Of the 8×8 values, values which are not adjacent to the maximum value are 0.

(R3) A sum total of the 8×8 values is 1.0.

In addition, as the adjacent values, in the most cases, there are eight values at positions adjacent to the top, the bottom, the left, the right, the top left, the bottom left, the top right and the bottom right of the maximum value, and, in the smallest case, there are three values when a value of any one position of four corners of the 8×8 positions is the maximum.

For example, in a case where there are eight values at positions adjacent to the top, the bottom, the left, the right, the top left, the bottom left, the top right and the bottom right of the maximum value as adjacent values, if a value after the maximum value is corrected is x, according to the rules R1, R2 and R3, by solving the expression $x \cdot 8 + 20x = 1.0$, of the 8×8 values as position information, the maximum value is corrected to x=0.714, the eight adjacent values are corrected to x/20=0.036, and the other values are corrected to 0.

Here, although, in the above-described case, the correction of adjusting the maximum value and the adjacent values is performed such that a relationship between the maximum value and the adjacent values (after being corrected) becomes a relationship of the maximum value being twenty times greater than the adjacent values in the rule R1, a relationship between the maximum value and adjacent values after being corrected is not limited to such a relationship.

As described with reference to FIG. 6, although, ideally, only a value of a position at which an object is present is 1 (fired best) and values of the other positions are 0 in relation to the 8×8 values as position information, even in a case where 8×8 values are obtained as such ideal position information in the correction of position information, correction (hereinafter, also referred to as averaging correction) may be employed in which peripheral positions of a fired position such as positions adjacent to the fired position are, as it were, slightly fired.

In the simulation, after the MTRNN is learned, a sequence of movement commands of twenty patterns different from the learning data has been given to each of the non-corrected MTRNN and the corrected MTRNN obtained through the learning, and, recognition (FIG. 14B) of the sequence of movement commands has been performed. Thereafter, in relation to a sequence of movement commands (target movement commands) which are targets of recognition, a prediction value of position information of an object moved in response to a sequence of the target movement commands has been generated using a unique initial value obtained through the recognition as a Cs initial value of each of the non-corrected MTRNN and the corrected MTRNN.

In addition, in the simulation, a prediction error of the prediction value of position information obtained in relation to the sequence of target movement commands of twenty patterns has been obtained.

The prediction error of the prediction value of position information obtained in the simulation is a distance between a position (a position fired best) of the maximum value of the 8×8 values which are prediction values of position information and a practical position (true value) of an object moved in response to the target movement commands.

FIG. 15 shows an average value (average distance) and a standard deviation of prediction errors of prediction values of position information obtained using each of the non-corrected MTRNN and the corrected MTRNN in the simulation.

According to FIG. 15, it can be confirmed that performing averaging correction of position information which is learning data so as to be used for learning the MTRNN can reduce a prediction error as compared with a case of not performing the averaging correction of position information.

Although the above description has been made on the premise that only a single foreground is included in an image, foregrounds may be included in an image not singly but in a plurality. Further, in a case where a plurality of objects which are foregrounds are included in an image, objects moved in response to a movement command and objects which are not objects moved in response to a movement command may be mixed as the plurality of objects.

Figure 16:
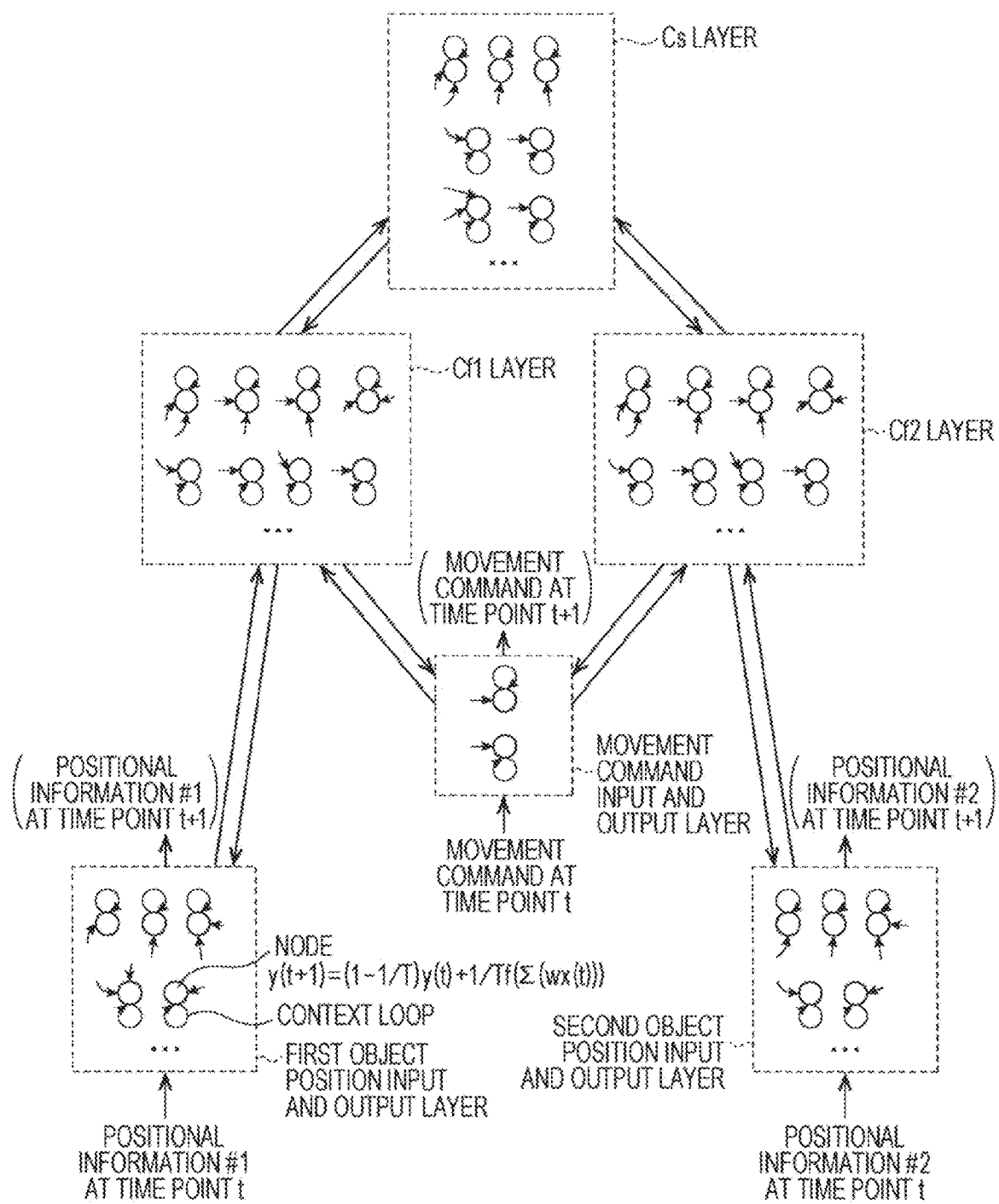
FIG. 16 is a diagram illustrating an example of the MTRNN for dealing with an image where two foregrounds #1 and #2 are superimposed on a background.

FIG. 16 is a diagram illustrating an example of the MTRNN for dealing with an image in which two foregrounds #1 and #2 are superimposed on a background.

In FIG. 16, the MTRNN has a movement command input and output layer, a first object position input and output layer, a second object position input and output layer, a Cf1 layer, a Cf2 layer, and a Cs layer.

In FIG. 16, both the movement command input and output layer and the first object position input and output layer are bidirectionally connected to the Cf1 layer. In addition, both the movement command input and output layer and the second object position input and output layer are bidirectionally connected to the Cf2 layer.

The Cf1 layer is also bidirectionally connected to the Cs layer in addition to the movement command input and output layer and the first object position input and output layer, and the Cf2 layer is also bidirectionally connected to the Cs layer in addition to the movement command input and output layer and the second object position input and output layer.

In FIG. 16, each of the movement command input and output layer, the first object position input and output layer, the second object position input and output layer, the Cf1 layer, the Cf2 layer, and the Cs layer of the MTRNN includes one or more nodes.

Each node of the movement command input and output layer and the first object position input and output layer is bidirectionally connected to the node of the Cf1 layer, and the node of the Cf1 layer is further bidirectionally connected to the Cs layer.

In addition, each node of the movement command input and output layer and the second object position input and output layer is bidirectionally connected to the node of the Cf2 layer, and the node of the Cf2 layer is further bidirectionally connected to the node of the Cs layer.

Each node of the Cf1 layer, the Cf2 layer, and the Cs layer is connected to the node of the same layer.

The node forming the movement command input and output layer, the first object position input and output layer, the second object position input and output layer, the Cf1 layer, the Cf2 layer, and the Cs layer has a context loop, is a neuron storing a context (updating an internal state), and updates a storage value $y(t+1)$ according to the expression $y(t+1)=(1-1/T)y(t)+1/Tf(\Sigma w_i x_i(t))$ in the same manner as the case described with reference to FIG. 13.

In FIG. 16, in the node of the movement command input and output layer, a movement command given from an external device or an output (a storage value updated according to the expression $y(t+1)=(1-1/T)y(t)+1/Tf(\Sigma w_i x_i(t))$) of the node of the Cf1 layer is an input $x_i(t)$ to the node.

In the node of the first object position input and output layer, position information of one of the foregrounds #1 and #2 given from an external device or an output (a storage value) of the node of the Cf1 layer is an input $x_i(t)$ to the node.

In the node of the second object position input and output layer, position information of the other of the foregrounds #1 and #2 given from an external device or an output (a storage value) of the node of the Cf2 layer is an input $x_i(t)$ to the node.

In the node of the Cf1 layer, an output of the node other than the Cf1 layer, an output of the node of the movement command input and output layer, or an output of the node of the first object position input and output layer is an input $x_i(t)$ to the node.

In the node of the Cf2 layer, an output of the node other than the Cf2 layer, an output of the node of the movement command input and output layer, or an output of the node of the second object position input and output layer is an input $x_i(t)$ to the node.

In the node of the Cs layer, an output of the node other than the Cs layer, an output of the node of the Cf1 layer, or an output of the node of the Cf2 layer is an input $x_i(t)$ to the node.

The movement command input and output layer includes, for example, two nodes, and, as the time constant T, for example, 2 is set in the same manner as the case of FIG. 13. The nodes of the movement command input and output layer perform information transmission with the nodes of the Cf1 layer and the Cf2 layer inside the MTRNN. The x component $V_x$ and the y component $V_y$ of the velocity vector $(V_x, V_y)$ as a movement command are input to and output from the nodes of the movement command input and output layer with outside of the MTRNN.

The first object position input and output layer and the second object position input and output layer have nodes of 64 (=8×8) which is the same as the number of position nodes forming the foreground layer of the appearance/position recognition network (FIGS. 4 and 7), and, for example, 1 is set as the time constant T.

The nodes of the first object position input and output layer perform information transmission with the nodes of the Cf1 layer and the nodes of the second object position input and output layer perform information transmission with the nodes of the Cf2 layer inside the MTRNN. With the outside of the MTRNN, 8×8 values of one of the foregrounds #1 and #2 are input to and output as position information from the nodes of the first object position input and output layer, and 8×8 values as position information of the other of the foregrounds #1 and #2 are input to and output from the nodes of the second object position input and output layer.

The Cf1 layer and the Cf2 layer have nodes of about 10 which is a value in a range of, for example, about 10 to 80, and, for example, 4 is set as the time constant T, in the same manner as the Cf layer of FIG. 13. The nodes of the Cf1 layer perform information transmission with the nodes of each of the movement command input and output layer, the first object position input and output layer, and the Cs layer, and nodes other than the Cf1 layer, and the nodes of the Cf2 layer perform information transmission with the nodes of each of the movement command input and output layer, the second object position input and output layer, and the Cs layer, and nodes other than the Cf2 layer.

In the same manner as the case of FIG. 13, the Cs layer has nodes of about 16 which is a value in a range of, for example, about 4 to 32, and, as the time constant T, for example, 70 which is greater than the time constant of the Cf1 layer and the Cf2 layer is set. The nodes of the Cs layer perform information transmission with the nodes of the Cf layer and nodes other than the Cs layer inside the MTRNN.

According to the MTRNN of FIG. 16, in a case where a sequence of movement commands, and a sequence of position information of each of the two foregrounds #1 and #2 including the foreground as an object moved in response to the movement commands and the foreground as an object other than the object moved in response to the movement commands are given, it is possible to perform an identification process of identifying a sequence of position information of the object moved in response to the sequence of movement commands, and, further, which one of the foregrounds #1 and #2 is an object moved in response to the sequence of movement commands.

In other words, for example, a sequence of position information of the foregrounds #1 and #2 obtained from a sequence of movement commands and an image having the two foregrounds #1 and #2 including the foreground as an object moved in response to the movement commands and the foreground as an object other than the object moved in response to the movement commands are prepared as learning data, and learning (FIG. 14A) of the MTRNN of FIG. 16 is performed using the learning data.

In addition, a sequence of position information of the foregrounds #1 and #2 obtained from a sequence of movement commands and an image having the two foregrounds #1 and #2 including the foreground as an object moved in response to the movement commands and the foreground as an object other than the object moved in response to the movement commands are prepared as identification data for identifying which one of the foregrounds #1 and #2 is an object moved in response to the sequence of movement commands, and the sequence of movement commands as identification data is given to the MTRNN of FIG. 16, thereby performing recognition (FIG. 14B) and generation (FIG. 14C).

According to the recognition and the generation performed by giving the sequence of movement commands as identification data to the MTRNN, it is possible to obtain a prediction value (a storage value of a node of the first object position input and output layer) of the position information of the foreground #1 from the node of the first object position input and output layer, and to obtain a prediction value (a storage value of a node of the second object position input and output layer) of the position information of the foreground #2 from the node of the second object position input and output layer.

After the prediction value of the position information of each of the foregrounds #1 and #2 is obtained, a prediction error of the prediction value of the position information of the foreground #1 for the position information of the foreground #1 as identification data and a prediction error of the prediction value of the position information of the foreground #2 for the position information of the foreground #2 as identification data are obtained, and thereby it is possible to identify which one of the foregrounds #1 and #2 is an object moved in response to a sequence of movement commands on the basis of the prediction errors.

In other words, it is possible to identify one of the foregrounds #1 and #2 of which a prediction error of the prediction value of the position information is smaller as an object moved in response to a sequence of movement commands.

Hereinafter, a process performed by the agent of FIG. 2 will be described assuming that the appearance/position recognition network of FIG. 7 and the MTRNN of FIG. 16 capable of dealing with an image in which two foregrounds #1 and #2 are superimposed on a background are stored in the network storage unit 15 as identification networks.

Learning Process

Figure 17:
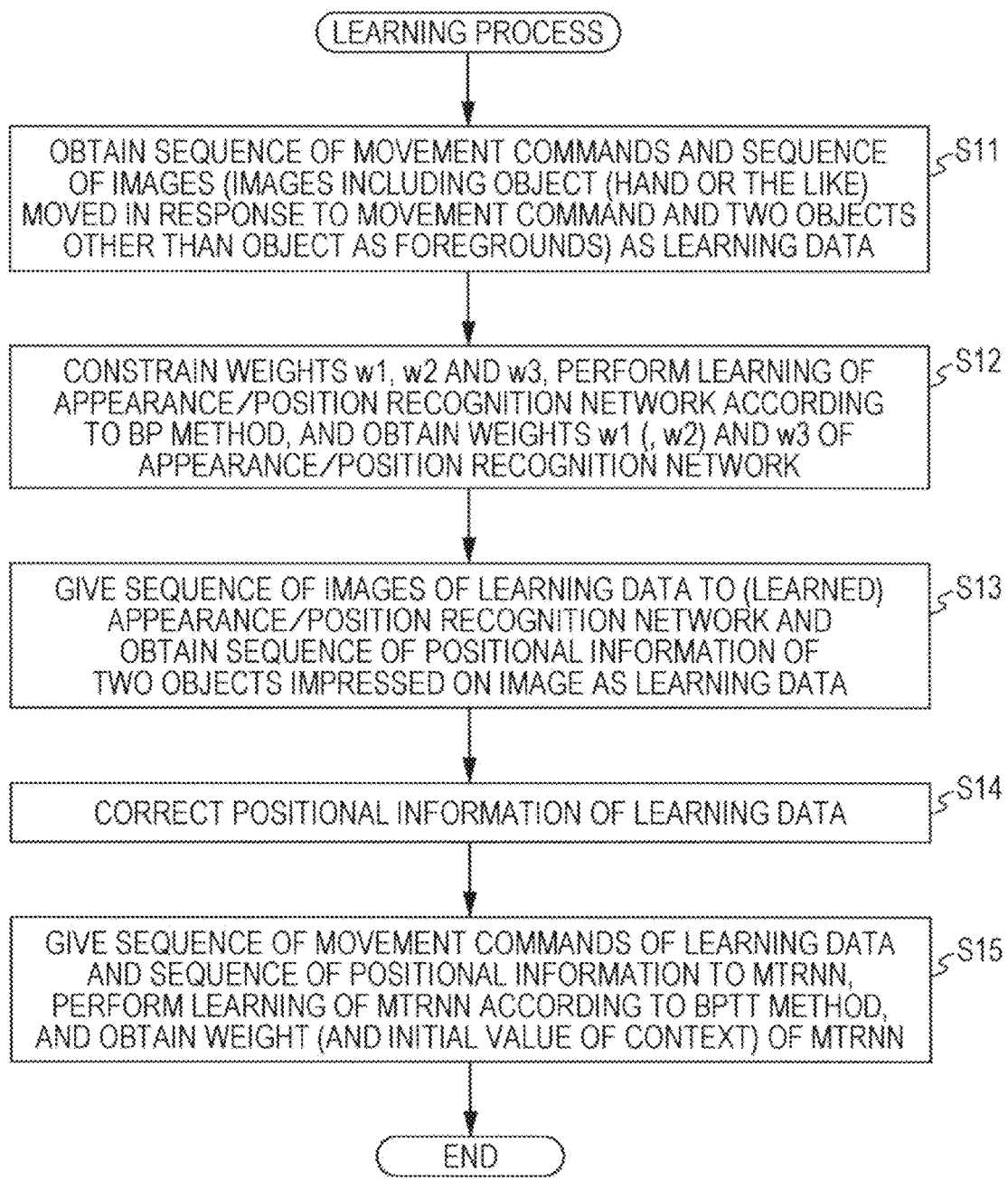
FIG. 17 is a flowchart illustrating a learning process.

FIG. 17 is a flowchart illustrating a learning process of performing learning of the identification networks stored in the network storage unit 15.

Here, as described with reference to FIG. 1, the hand of the agent is placed on the table on which a non-body (an object which is not the body of the agent) is placed, and the agent captures an image in which the table is a background and the non-body and the hand are foregrounds with the camera 11 while moving the hand in response to a movement command issued by the action control unit 12 (FIG. 2).

In the agent, an image captured by the camera 11 and a movement command issued by the action control unit 12 are stored in the data storage unit 14 in correlation with each other.

In step S11, the learning unit 16 reads a sequence of sets of movement commands and images stored in the data storage unit 14 in correlation with each other, and thereby acquires the sequence of sets of movement commands and images as learning data, and the process proceeds to step S12.

In step S12, the network learning portion 17 constrains a weight of the appearance/position recognition network as the identification networks stored in the network storage unit 15 as described with reference to FIG. 5, gives images as learning data to the appearance/position recognition network, and performs learning of the appearance/position recognition network according to the BP method.

The network learning portion 17 obtains a weight of the appearance/position recognition network through the learning of the appearance/position recognition network, and stores the weight in the network storage unit 15 as the learning result of the appearance/position recognition network, and the process proceeds from step S12 to step S13.

In addition, here, since the appearance/position recognition network has two foreground layers #1 and #2, in the learning of the appearance/position recognition network in step S12, as shown in FIG. 7, the weight w1 between the position node of the foreground layer #1 and the pixel node of the image layer, the weight w1' between the position node of the foreground layer #2 and the pixel node of the image layer, the weight w2 between the position node of the foreground layer #1 and the background node of the background layer, the weight w2' between the position node of the foreground layer #2 and the background node of the background layer, and the weight w3 between the background node of the background layer and the pixel node of the image layer are obtained.

However, the weight w2 between the position node of the foreground layer #1 and the background node of the background layer is constrained to a fixed value of 0 or −1 as described with reference to FIG. 5, and thus the fixed value is employed as it is as the weight w2 which is a learning result. This is also the same for the weight w2' between the position node of the foreground layer #2 and the background node of the background layer.

In step S13, the MTRNN learning portion 18 inputs a sequence of images as learning data to the (learned) appearance/position recognition network stored in the network storage unit 15, thereby obtaining a sequence of position information of the objects which are two foregrounds #1 and #2 impressed on the images as learning data, and the process proceeds to step S14.

In other words, the MTRNN learning portion 18 gives position information #1 to the foreground layer #1 of the appearance/position recognition network and gives position information #2 to the foreground layer #2, thereby obtaining an error of a prediction image output from the image layer for the images as learning data in relation to the position information #1 and #2. In addition, the MTRNN learning portion 18 obtains the position information #1 and #2 for reducing an error of the prediction image according to the BP method in a state where the weights w1 to w3 of the appearance/position recognition network are fixed.

In addition, here, for simplicity of description, for example, the position information #1 is position information of the foreground #1, and the position information #2 is position information of the foreground #2.

In the above-described way, in relation to the images as learning data, the position information #1 and #2 obtained in the appearance/position recognition network may be included in the learning data by forming a set with images from which the position information #1 and #2 is obtained and movement commands which form a set with the images.

In step S14, the MTRNN learning portion 18 performs the averaging correction of correcting each piece of the position information #1 and #2 as learning data obtained in step S13 according to the rules R1 to R3 described with reference to FIG. 15, and the process proceeds to step S15.

In step S15, the MTRNN learning portion 18 gives the movement commands as learning data and a sequence of sets of the position information #1 and #2 after the averaging correction to the MTRNN as the identification network stored in the network storage unit 15, and performs learning of the MTRNN according to the BPTT method.

The MTRNN learning portion 18 obtains a weight $w_i$ of the MTRNN and an initial value of a storage value (context) of the node of the Cs layer through the learning of the MTRNN, so as to be stored in the network storage unit 15 as the learning result of the MTRNN, and the process finishes.

In addition, in the learning process of the identification networks of FIG. 17, the learning of the MTRNN is performed after the learning of the appearance/position recognition network is completed; however, the learning of the appearance/position recognition network and the learning of the MTRNN may be performed in parallel.

In a case where the learning of the appearance/position recognition network and the learning of the MTRNN are performed in parallel in the learning process of the identification networks, the network learning portion 17 inputs an image at the time point t as learning data to the appearance/position recognition network, and obtains position information of a foreground of the image at the time point t (recognizes a position of the foreground).

Thereafter, the MTRNN learning portion 18 gives the movement command at the time point t as learning data and the position information at the time point t obtained in the appearance/position recognition network to the MTRNN, and obtains a weight of the MTRNN and an initial value of a storage value (context) of the node of the Cs layer for reducing a prediction error of a prediction value of a movement command at the next time point t+1 according to the BPTT method.

In addition, the MTRNN learning portion 18 fixes the weight of the MTRNN and the initial value of the storage value of the node of the Cs layer to values obtained according to the BPTT method, and gives the movement command at the time point t as learning data and the position information at the time point t obtained in the appearance/position recognition network, thereby obtaining a prediction value of position information at the time point t+1.

The network learning portion 17 gives the prediction value of the position information at the time point t+1 to the position node of the appearance/position recognition network as an input value, generates a prediction value (prediction image) of an image at the time point t+1, and obtains a weight (a weight other than weights of which values are constrained to fixed values) of the appearance/position recognition network for reducing a prediction error of the prediction value of the image at the time point t+1 according to the BP method.

In the network learning portion 17 and the MTRNN learning portion 18, the same processes are repeatedly performed until a prediction error of the prediction value of the image at the time point t+1 obtained by the network learning portion 17 and a prediction error of the prediction value of the movement command at the time point t+1 obtained by the MTRNN learning portion 18 converge, and thereby the learning of the appearance/position recognition network and the learning of the MTRNN are performed in parallel.

Identification Process

Figure 18:
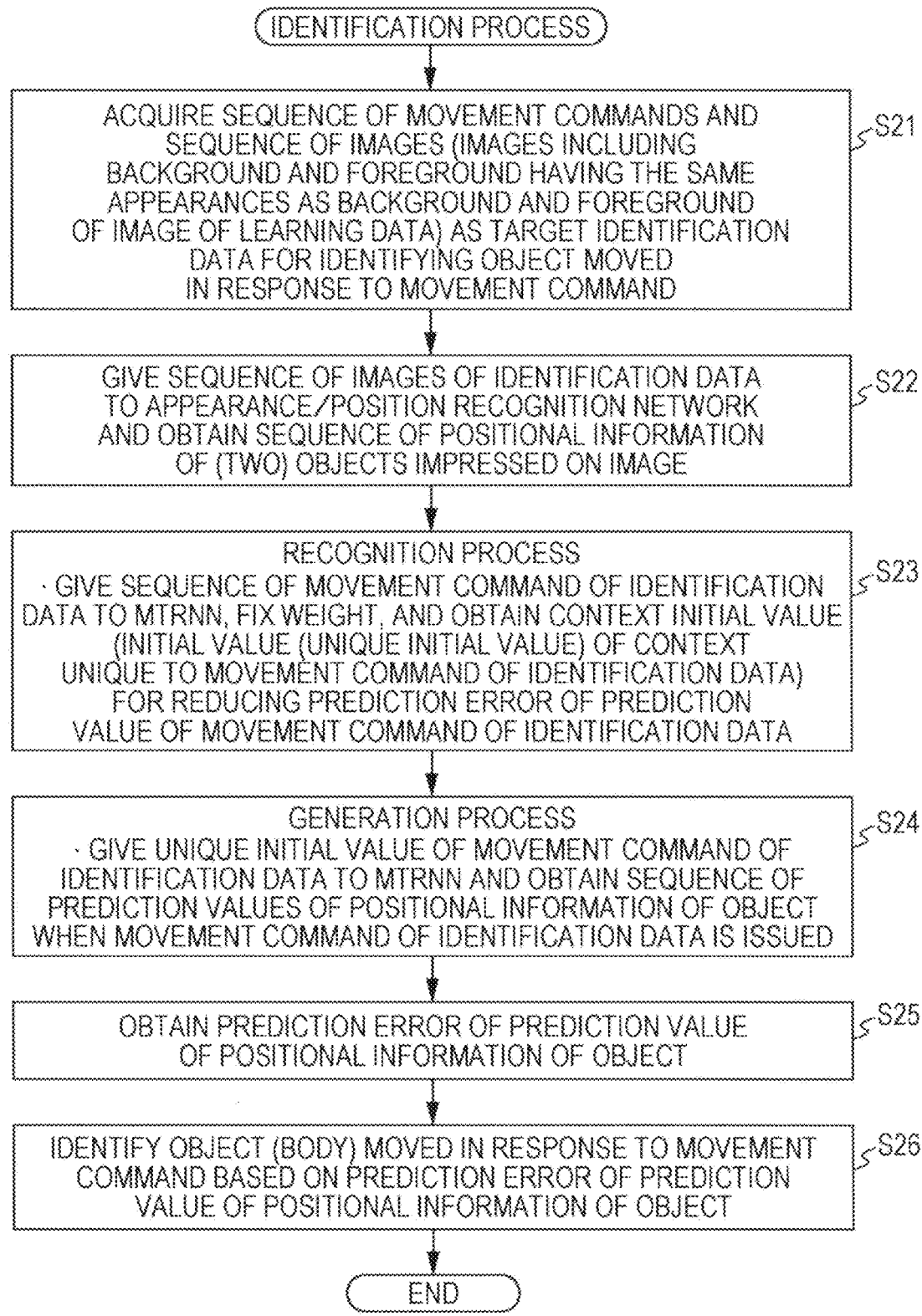
FIG. 18 is a flowchart illustrating an identification process.

FIG. 18 is a flowchart illustrating an identification process of identifying which one of two foregrounds #1 and #2 included in an image is an object moved in response to a sequence of movement commands by using the identification networks stored in the network storage unit 15 in the agent (FIG. 2).

Here, as described with reference to FIG. 17, the agent (FIG. 2) captures an image in which the table is a background and the non-body and the hand are foregrounds with the camera 11 while moving the hand in response to a movement command issued by the action control unit 12. In addition, an image captured by the camera 11 and a movement command issued by the action control unit 12 are stored in the data storage unit 14 in correlation with each other.

In step S21, the recognition generating unit 19 reads a sequence of sets of movement commands and images stored in the data storage unit 14 in correlation with each other, and thereby acquires the sequence of sets of movement commands and images as target identification data for identifying a body (here, the hand) which is an object moved in response to a movement command, and the process proceeds to step S22.

Here, the sequence of sets of movement commands and images acquired as identification data may be a sequence conforming with all or a portion of the sequence of sets of movement commands and images as learning data, or may be a sequence different from the sequence of sets of movement commands and images as learning data.

In step S22, the recognition generating unit 19 inputs a sequence of images as identification data to the appearance/position recognition network as the identification network stored in the network storage unit 15, and obtains sequences of respective pieces of position information #1 and #2 of objects which are two foregrounds #1 and #2 impressed on the images as identification data in the same manner as step S13 of FIG. 17.

In addition, the recognition generating unit 19 obtains a position of the maximum value of 8×8 values which are the position information #1 as a true value of a position of the foreground #1 and obtains a position of the maximum value of 8×8 values which are the position information #2 as a true value of a position of the foreground #2, so as to be supplied to the identification unit 20, and the process proceeds from S22 to step S23.

In step S23, recognition (FIG. 14B) is performed using the MTRNN.

In other words, in step S23, the recognition generating unit 19 sets a sequence of movement commands which is identification data as a recognition target and gives a sequence of movement commands (target movement commands) which are the recognition targets to the MTRNN as the identification network stored in the network storage unit 15, thereby performing recognition of the sequence of target movement commands by using, for example, the BPTT method, and, the process proceeds to step S24.

Specifically, the recognition generating unit 19 gives a target movement command at the time point t to the MTRNN so as to obtain a prediction value of a target movement command at the next time point t+1, and obtains a unique initial value which is an initial value of a storage value (context) of the node of the Cs layer for reducing a prediction error of the prediction value of the target movement command at the time point t+1 as the recognition result of the target movement commands (the sequence thereof) in a state where the weight $w_i$ of the MTRNN is fixed.

In step S24, the recognition generating unit 19 gives the unique initial value obtained as a result of the recognition of the target movement command as a Cs initial value of the MTRNN, and performs generation (FIG. 14C) using the MTRNN, thereby obtaining an output value of the node of the first object position input and output layer of the MTRNN as a prediction value of position information of one of the foregrounds #1 and #2 and obtaining an output value of the node of the second object position input and output layer of the MTRNN as a prediction value of position information of the other of the foregrounds #1 and #2 so as to be supplied to the identification unit 20, and the process proceeds to step S25.

In addition, here, for simplicity of description, for example, an output value of the node of the first object position input and output layer is set as a prediction value of the position information #1 of the foreground #1 of the foregrounds #1 and #2, and an output value of the node of the second object position input and output layer of the MTRNN is set as a prediction value of the position information #2 of the foreground #2 of the foregrounds #1 and #2.

In step S25, the identification unit 20 obtains a prediction error of the prediction value of the position information #1 of the foreground #1 and a prediction error of the prediction value of the position information #1 of the foreground #2, by using the prediction value of the position information #1 of the foreground #1 and the prediction value of the position information #1 of the foreground #2 supplied in step S24 from the recognition generating unit 19, and the true value of the position of the foreground #1 and the true value of the position of the foreground #2 supplied in step S22 from the recognition generating unit 19, and the process proceeds to step S26.

In other words, the identification unit 20 obtains a distance between a position of the maximum value of 8×8 values which are prediction values of the position information #1 of the foreground #1 and a true value of the position of the foreground #1 as a prediction error of a prediction value of the position information #1 of the foreground #1. A prediction error of a prediction value of the position information #2 of the foreground #2 may be obtained in the same manner.

In step S26, the identification unit 20 identifies which one of the two foregrounds #1 and #2 impressed on the images as identification data is an object moved in response to the sequence of movement commands as identification data on the basis of the prediction error of the prediction value of the position information #1 of the foreground #1 and the prediction error of the prediction value of the position information #1 of the foreground #2, and the process finishes.

Here, in the MTRNN as the identification network, through the learning using learning data, a relationship between a movement command as the learning data and, for example, a position of the hand (a trajectory (movement) of positions of the hand) which is an object moved in response to the movement command is obtained.

Therefore, in a case where one of the foregrounds #1 and #2 is the hand which is a body moved in response to a movement command and the other is a non-body, in relation to a prediction value of the position information #1 of the foreground #1 and a prediction value of the position information #2 of the foreground #2 obtained using the MTRNN, a prediction error of the prediction value of the position information of the hand moved in response to a movement command is smaller than that of the prediction value of the position information of the non-body (a probability of the right answer is high).

Therefore, the identification unit 20 identifies that a foreground having a smaller prediction error of the position information of two foregrounds #1 and #2 impressed on the images as identification data is an object moved in response to a sequence of movement commands as identification data.

FIG. 19 is a diagram illustrating a result of a simulation of the learning process of FIG. 17 and the identification process of FIG. 18 performed by the present inventor.

In the simulation, a sequence of movement commands of 380 patterns and a sequence of images having the hand which is a body moved in response to each movement command and a non-body as foregrounds have been prepared as learning data of 380 patterns, and the learning process of FIG. 17 has been performed.

In addition, in the simulation, after the learning process of FIG. 17 is completed, a sequence of movement commands of twenty patterns different from the learning data and a sequence of images having the hand which is a body moved in response to each movement command and a non-body as foregrounds have been given as identification data to the appearance/position recognition network and the MTRNN which are identification networks obtained through the learning process, and, the identification process of FIG. 18 has been performed.

FIG. 19 shows an average value (average distance) and a standard deviation of prediction errors of prediction values of position information of each of the hand and the non-body obtained in the identification process.

In FIG. 19, since an average value of prediction errors of prediction values of position information of the hand is 1.14, and an average value of prediction errors of prediction values of position information of the non-body is 2.41, if prediction accuracy is indicated by a reciprocal of, for example, an average value of prediction errors, according to the identification networks, it is possible to predict position information of the hand which is a body moved in response to a movement command at prediction accuracy which is about 2.11 (=2.41/1.14) times higher than that of the non-body.

Therefore, it is possible to identify a foreground having a smaller prediction error of a prediction value of the position information of two foregrounds obtained using the identification networks, as a body moved in response to a movement command.

In addition, in a case where only a single foreground is included in an image, according to the identification networks, for example, when a prediction error of a prediction value of position information is larger than a predetermined threshold value, the foreground may be identified as not being a body (non-body), and when not larger than the predetermined threshold value, the foreground may be identified as being a body.

In addition, in a case where a plurality of foregrounds are included in an image, according to the identification networks, for example, a foreground of which a prediction error of a prediction value of position information is merely the minimum may be identified as being a body, or a foreground of which a prediction error of a prediction value of position information is the minimum and equal to or less than a threshold value may be identified as being a body.

In a case where a foreground of which a prediction error of a prediction value of position information is the minimum and equal to or less than a threshold value is identified as being a body, there is no foreground of which a prediction error of a prediction value of position information is equal to or less than a threshold value, all the foregrounds are identified as being non-bodies.

Description of Computer according to Embodiment of Present Technology

Next, the above-described series of processes may be performed by hardware or software. When a series of processes is performed by the software, a program constituting the software is installed in a general purpose computer or the like.

Therefore, FIG. 20 shows a configuration example of the computer in which the program for executing the above-described series of processes is installed according to an embodiment.

The program may be recorded on a hard disk 105 or a ROM 103 which is a recording medium embedded in the computer.

Alternatively, the program may be stored (recorded) on a removable recording medium 111. The removable recording medium 111 may be provided as so-called package software.

Here, the removable recording medium 111 includes, for example, a flexible disc, a CD-ROM (Compact Disc Read Only Memory), an MO (Magneto Optical) disc, a DVD (Digital Versatile Disc), a magnetic disk, a semiconductor memory, and the like.

In addition, the program may be installed onto the computer from the removable recording medium 111 as described above, and further may be downloaded to the computer via a communication network or a broadcasting network and installed in the built-in hard disk 105. That is to say, the program may be transmitted to the computer, for example, in a wireless manner, from a download site via an artificial satellite for digital satellite broadcasting, or may be transmitted to the computer in a wired manner via a network such as a LAN (Local Area Network) or the Internet.

The computer has a CPU (Central Processing Unit) 102 embedded therein, and the CPU 102 is connected to an input and output interface 110 via a bus 101.

When a command is input by a user via the input and output interface 110 through an operation of an input unit 107 or the like, the CPU 102 executes a program stored in a ROM (Read Only Memory) 103 in response thereto. Alternatively, the CPU 102 loads a program stored in the hard disk 105 to a RAM (Random Access Memory) 104 so as to be executed.

Thereby, the CPU 102 performs the process according to the above-described flowchart or the process performed by the above-described configuration of the block diagram. In addition, the CPU 102 outputs or transmits the processed result from an output unit 106 or a communication unit 108 via, for example, the input and output interface 110, or records the result on the hard disk 105, as necessary.

In addition, the input unit 107 includes a keyboard, a mouse, a microphone, or the like. Further, the output unit 106 includes an LCD (Liquid Crystal Display), a speaker, or the like.

Here, in the present specification, a process performed by the computer according to the program is not necessarily performed in a time series according to an order described as a flowchart. In other words, the process performed by the computer according to the program also includes a process (for example, a parallel process or a process using objects) performed in parallel or separately.

In addition, the program may be processed by a single computer (processor) or may be processed so as to be distributed by a plurality of computers. Further, the program may be transmitted to a remote computer and be executed.

In addition, in the present specification, the system indicates an assembly of a plurality of constituent elements (devices, modules (components), or the like), and whether or not all the constituent elements are in the same casing is not important. Therefore, both a plurality of devices which are accommodated in separate casings and are connected to each other via a network, and a single device where a plurality of modules are accommodated in a single casing are a system.

In addition, embodiments of the present technology are not limited to the above-described embodiments but may have various modifications without departing from the scope of the present technology.

For example, the present technology may employ cloud computing where a single function is distributed to a plurality of devices via a network and is processed in cooperation.

In addition, each step described in the above flowchart may be not only executed by a single device, but may be also distributed to a plurality of devices and be executed.

Further, in a case where a single step includes a plurality of processes, a plurality of processes included in the step may be not only executed by a single device, but may be also distributed to a plurality of devices and be executed.

In addition, the present technology may have the following configurations.

[1]

An information processing apparatus including a network learning portion that performs learning of an appearance/position recognition network by constraining first to third weights and using a learning image, wherein the appearance/position recognition network has a foreground layer including a position node which is a neuron corresponding to a position of a foreground of an image, a background layer including a background node which is a neuron corresponding to a background of an image, and an image layer including a pixel node which is a neuron corresponding to a pixel of an image in which the foreground is superimposed on the background, and is a neural network in which the position node, the background node, and the pixel node are connected to each other, wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground, wherein the background node outputs a value obtained through calculation including weighted sum of outputs of the position node, and wherein the pixel node outputs a value obtained through calculation including weighted sum of outputs of the position node and weighted sum of outputs of the background node.

[2]

The information processing apparatus set forth in [1], wherein, in relation to any two position nodes, the network learning portion constrains the first weight such that a first weight between a pixel node corresponding to a pixel located at a position having a predetermined positional relationship from a position corresponding to one position node of the two position nodes and one position node, and a first weight between a pixel node corresponding to a pixel located at a position having the predetermined positional relationship from a position corresponding to the other position node of the two position nodes and the other position node become the same value, and wherein, in relation to each position node, the network learning portion constrains a second weight between the position node and a background node corresponding to a background in a predetermined range having a position corresponding to the position node as a reference to a fixed value for suppressing firing of the background node, and performs learning of the appearance/position recognition network.

[3]

The information processing apparatus set forth in [2], wherein, in relation to each background node, the network learning portion constrains a third weight between the background node and a pixel node corresponding to a pixel other than a pixel of a background corresponding to the background node to 0, and performs learning of the appearance/position recognition network.

The information processing apparatus set forth in any one of [1] to [3], wherein the network learning portion performs learning of the appearance/position recognition network so as to reduce an error of a prediction image which is an image having a value output from the pixel node of the appearance/position recognition network as a pixel value, for the learning image.

[5]

The information processing apparatus set forth in [4], further including an MTRNN learning portion that performs learning of an MTRNN (Multiple Timescale Recurrent Neural Network) by using a sequence of the position information which is an input value of the position node of the appearance/position recognition network and a sequence of movement commands for reducing an error of the prediction image for a sequence of images including an object moved in response to the movement commands for moving the object as a foreground; and an identification unit that identifies whether or not a foreground in the images included in identification data is an object moved in response to the movement commands included in the identification data on the basis of errors of a sequence of prediction values of position information output from the MTRNN, for inputs of the sequence of the movement commands included in the identification data which includes the sequence of the movement commands and the sequence of the images and is used to identify an object moved in response to the movement commands.

[6]

The information processing apparatus set forth in [5], wherein the MTRNN learning portion corrects an input value such that input values of peripheral position nodes of a position node having the maximum input value of input values of the position nodes and the maximum input value have a predetermined relationship, and performs learning of the MTRNN by using the corrected input value of the position node as the position information.

[7]

The information processing apparatus set forth in [5] or [6], wherein the MTRNN has a position input and output layer that includes a neuron which the position information is input to and output from; a movement command input and output layer that includes a neuron which the movement command is input to and output from; a first context layer that includes a neuron which is connected to the position input and output layer and the movement command input and output layer and of which a storage value is updated at a predetermined time constant; and a second context layer that includes a neuron which is connected to the first context layer and of which a storage value is updated at a time constant larger than the predetermined time constant.

[8]

The information processing apparatus set forth in any one of [1] to [7], wherein the appearance/position recognition network has a plurality of foreground layers connected to each of the background node and the pixel node.

[9]

An information processing method including performing learning of an appearance/position recognition network by constraining first to third weights and using a learning image, wherein the appearance/position recognition network has a foreground layer including a position node which is a neuron corresponding to a position of a foreground of an image, a background layer including a background node which is a neuron corresponding to a background of an image, and an image layer including a pixel node which is a neuron corresponding to a pixel of an image in which the foreground is superimposed on the background, and is a neural network in which the position node, the background node, and the pixel node are connected to each other, wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground, wherein the background node outputs a value obtained through calculation including a weighted sum of outputs of the position node, and wherein the pixel node outputs a value obtained through calculation including a weighted sum of outputs of the position node and weighted sum of outputs of the background node.

[10]

A program causing a computer to function as a network learning portion that performs learning of an appearance/position recognition network by constraining first to third weights and using a learning image, wherein the appearance/position recognition network has a foreground layer including a position node which is a neuron corresponding to a position of a foreground of an image, a background layer including a background node which is a neuron corresponding to a background of an image, and an image layer including a pixel node which is a neuron corresponding to a pixel of an image in which the foreground is superimposed on the background, and is a neural network in which the position node, the background node, and the pixel node are connected to each other, wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground, wherein the background node outputs a value obtained through calculation including a weighted sum of outputs of the position node, and wherein the pixel node outputs a value obtained through calculation including a weighted sum of outputs of the position node and a weighted sum of outputs of the background node.

The present disclosure contains subject matter related to that disclosed in Japanese Priority Patent Application JP 2011-267560 filed in the Japan Patent Office on Dec. 7, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a network learning portion that performs learning of an appearance/position recognition network by constraining a first weight, a second weight and a third weight and using a learning image,
wherein the appearance/position recognition network has a foreground layer including a position node which is a neuron corresponding to a position of a foreground of the learning image, a background layer including a background node which is a neuron corresponding to a background of the learning image, and an image layer including a pixel node which is a neuron corresponding to a pixel of the learning image in which the foreground is superimposed on the background, and is a neural network in which:
the position node is connected to the background node,
the position node is connected to the pixel node, and
the background node is connected to the pixel node,
wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground on the learning image, wherein the background node outputs a value including weighted sum of outputs of the position node, and wherein the pixel node outputs a value including weighted sum of outputs of the position node and weighted sum of outputs of the background node.

2. The information processing apparatus according to claim 1, wherein, in relation to any two position nodes, the network learning portion constrains the first weight such that the first weight between the pixel node corresponding to a pixel located at a position having a predetermined positional relationship from a position corresponding to one position node of the two position nodes and one position node, and the first weight between the pixel node corresponding to a pixel located at a position having the predetermined positional relationship from a position corresponding to the other position node of the two position nodes and the other position node become a same value, and wherein, in relation to each position node, the network learning portion constrains the second weight between the position node and the background node corresponding to a background in a predetermined range having a position corresponding to the position node as a reference to a fixed value for suppressing firing of the background node, and performs learning of the appearance/position recognition network.

3. The information processing apparatus according to claim 2, wherein, in relation to each background node, the network learning portion constrains the third weight between the background node and the pixel node corresponding to a pixel other than a pixel of a background corresponding to the background node to 0, and performs learning of the appearance/position recognition network.

4. The information processing apparatus according to claim 3, wherein the network learning portion performs learning of the appearance/position recognition network so as to reduce an error of a prediction image which is an image having a value output from the pixel node of the appearance/position recognition network as a pixel value, for the learning image.

5. The information processing apparatus according to claim 4, further comprising:

an MTRNN learning portion that performs learning of an MTRNN (Multiple Timescale Recurrent Neural Network) by using a sequence of position information which is the input value of the position node of the appearance/position recognition network and a sequence of movement commands for reducing the error of the prediction image for a sequence of images including an object moved in response to the sequence of movement commands for moving the object as a foreground; and an identification unit that identifies whether or not the foreground in the sequence of images included in identification data is the object moved in response to the sequence of movement commands included in the identification data on the basis of errors of a sequence of prediction values of position information output from the MTRNN, for inputs of the sequence of the movement commands included in the identification data which includes the sequence of movement commands and the sequence of the images and is used to identify the object moved in response to the sequence of movement commands.

6. The information processing apparatus according to claim 5, wherein the MTRNN learning portion corrects the input value such that input values of peripheral position nodes of a position node having a maximum input value have a predetermined relationship, and performs learning of the MTRNN by using the corrected input value of the position node as the position information.

7. The information processing apparatus according to claim 5, wherein the MTRNN has:

a position input and output layer that includes a neuron which the position information is input to and output from;

a movement command input and output layer that includes a neuron which the sequence of movement commands is input to and output from;

a first context layer that includes a neuron which is connected to the position input and output layer and the movement command input and output layer and of which a first storage value is updated at a predetermined time constant; and a second context layer that includes a neuron which is connected to the first context layer and of which a second storage value is updated at a time constant larger than the predetermined time constant.

8. The information processing apparatus according to claim 5, wherein the appearance/position recognition network has a plurality of foreground layers connected to each of the background node and the pixel node.

9. An information processing method comprising:

performing learning of an appearance/position recognition network by constraining a first weight, a second weight and a third weight and using a learning image, wherein the appearance/position recognition network has a foreground layer including a position node which is a neuron corresponding to a position of a foreground of the learning image, a background layer including a background node which is a neuron corresponding to a background of the learning image, and an image layer including a pixel node which is a neuron corresponding to a pixel of the learning image in which the foreground is superimposed on the background, and is a neural network in which:

the position node is connected to the background node, the position node is connected to the pixel node, and the background node is connected to the pixel node, wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground on the learning image, wherein the background node outputs a value including weighted sum of outputs of the position node, and wherein the pixel node outputs a value including weighted sum of outputs of the position node and weighted sum of outputs of the background node.

10. A non-transitory computer readable medium having stored thereon, a computer program having at least one code section executable by a computer, thereby causing the computer to function as:

a network learning portion that performs learning of an appearance/position recognition network by constraining a first weight, a second weight and a third weight and using a learning image, wherein the appearance/position recognition network has a foreground layer including a position node which is a neuron corresponding to a position of a foreground of the learning image, a background layer including a background node which is a neuron corresponding to a background of the learning image, and an image layer including a pixel node which is a neuron corresponding to a pixel of the learning image in which the foreground is superimposed on the background, and is a neural network in which:

the position node is connected to the background node,
the position node is connected to the pixel node, and
the background node is connected to the pixel node, wherein the first weight is a connection weight between the position node and the pixel node, the second weight is a connection weight between the position node and the background node, and the third weight is a connection weight between the background node and the pixel node, wherein the position node outputs a value corresponding to position information which is input as an input value and indicates a position of the foreground on the learning image, wherein the background node outputs a value including weighted sum of outputs of the position node, and wherein the pixel node outputs a value including weighted sum of outputs of the position node and weighted sum of outputs of the background node.

11. The information processing system according to claim 1, wherein the appearance/position recognition network has a plurality of foreground layers corresponding to each of a plurality of foregrounds included in the learning image.

12. The information processing system according to claim 1, wherein the network learning portion performs learning of the appearance/position recognition network so as to reduce an error of a prediction image, wherein the prediction image is an image in which the foreground is present at a position indicated by the position information of the foreground.

13. The information processing apparatus according to claim 12, wherein an error minimizing position information is obtained for reducing the error of the prediction image.

14. The information processing apparatus according to claim 13, wherein a final recognition position of the foreground is a position corresponding to a maximum position node of the error minimizing position information.

* * * * *